(12) United States Patent
Tsuchimoto et al.

(10) Patent No.: US 10,583,859 B2
(45) Date of Patent: Mar. 10, 2020

(54) ELECTRIC POWER STEERING APPARATUS

(71) Applicant: Mitsubishi Electric Corporation, Tokyo (JP)

(72) Inventors: Yuya Tsuchimoto, Tokyo (JP); Isao Kezobo, Tokyo (JP); Shunsuke Nakajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/753,605

(22) PCT Filed: Dec. 2, 2015

(86) PCT No.: PCT/JP2015/083884
§ 371 (c)(1),
(2) Date: Feb. 20, 2018

(87) PCT Pub. No.: WO2017/094141
PCT Pub. Date: Jun. 8, 2017

(65) Prior Publication Data
US 2018/0257701 A1    Sep. 13, 2018

(51) Int. Cl.
*B62D 5/04* (2006.01)
*B62D 5/06* (2006.01)

(52) U.S. Cl.
CPC ........... *B62D 5/0487* (2013.01); *B62D 5/049* (2013.01); *B62D 5/0463* (2013.01); *B62D 5/0409* (2013.01)

(58) Field of Classification Search
CPC .......... B62D 5/04; B62D 5/0472; B62D 5/06; G06F 15/20
See application file for complete search history.

(56) References Cited

U.S. PATENT DOCUMENTS 5,541,841 A * 7/1996 Tanaka ................. B62D 5/0463
180/446
5,677,611 A 10/1997 Yoshihara et al.
(Continued)

FOREIGN PATENT DOCUMENTS

JP    04-110272 A    4/1992
JP    09-023501 A    1/1997
(Continued)

OTHER PUBLICATIONS

International Search Report for PCT/JP2015/083884, dated Feb. 16, 2016.
(Continued)

*Primary Examiner* — Yuri Kan
(74) *Attorney, Agent, or Firm* — Sughrue Mion, PLLC; Richard C. Turner

(57) ABSTRACT

When the state where steering torque detected by a torque detection unit is normal and the value of the steering torque is the same as or larger than a threshold value continues, an assist command generation unit that generates an assist command corresponding to steering torque produced by a driver limits the assist command; a failure determination unit includes a first failure determination unit that performs determination on a failure regardless of the limitation of the assist command and a second failure determination unit that performs determination on a failure while the assist command is limited, and stops driving of a motor when the second failure determination unit determines that there exists a failure.

19 Claims, 9 Drawing Sheets

(56) References Cited

U.S. PATENT DOCUMENTS

| | | | |
|---|---|---|---|
| 6,018,691 A * | 1/2000 | Yamamoto | B62D 5/0463 |
| | | | 180/404 |
| 6,158,545 A | 12/2000 | Kaji et al. | |
| 6,260,655 B1 | 7/2001 | Mukai et al. | |
| 6,295,496 B1 * | 9/2001 | Shinmura | B62D 5/0472 |
| | | | 180/446 |
| 2003/0102839 A1 | 6/2003 | Kinpara et al. | |
| 2003/0106737 A1 | 6/2003 | Itakura | |
| 2003/0117097 A1 | 6/2003 | Iwata et al. | |
| 2005/0024009 A1 | 2/2005 | Kinpara et al. | |
| 2005/0045413 A1 * | 3/2005 | Shitamitsu | B62D 5/003 |
| | | | 180/402 |
| 2005/0168892 A1 | 8/2005 | Kuroda et al. | |
| 2006/0043917 A1 | 3/2006 | Kikufu et al. | |
| 2013/0179039 A1 | 7/2013 | Uryu | |
| 2013/0278198 A1 | 10/2013 | Ito | |
| 2014/0297123 A1 * | 10/2014 | Nozawa | B62D 6/04 |
| | | | 701/41 |
| 2015/0249409 A1 | 9/2015 | Nakajima et al. | |
| 2015/0274202 A1 * | 10/2015 | Tsunoda | B62D 5/04 |
| | | | 180/446 |
| 2015/0360715 A1 * | 12/2015 | Shimizu | B62D 5/001 |
| | | | 701/43 |
| 2018/0194391 A1 * | 7/2018 | Parette | B62D 5/0487 |

FOREIGN PATENT DOCUMENTS

| | | | |
|---|---|---|---|
| JP | 2000-142435 | A | 5/2000 |
| JP | 3104865 | B2 | 10/2000 |
| JP | 2003-026020 | A | 1/2003 |
| JP | 2003-170857 | A | 6/2003 |
| JP | 2003-182608 | A | 7/2003 |
| JP | 2005-212579 | A | 8/2005 |
| JP | 2006-067731 | A | 3/2006 |
| JP | 2008-137492 | A | 6/2008 |
| JP | 2009-044879 | A | 2/2009 |
| JP | 2010-011546 | A | 1/2010 |
| JP | 4672236 | B2 | 4/2011 |
| JP | 2013-141869 | A | 7/2013 |
| JP | 2013-179742 | A | 9/2013 |
| JP | 2014-100981 | A | 6/2014 |
| JP | 5621598 | B2 | 11/2014 |
| JP | 2015-136948 | A | 7/2015 |
| WO | 2014/080497 | A1 | 5/2014 |

OTHER PUBLICATIONS

Notification of Reasons for Refusal dated Apr. 2, 2019 issue by the Japanese Patent Office in counterpart application No. 2017-553551.

* cited by examiner

ELECTRIC POWER STEERING APPARATUS

This application is a National Stage of International Application No. PCT/JP2015/083884 filed Dec. 2, 2015.

TECHNICAL FIELD

The present invention relates to an electric power steering apparatus and particularly to an electric power steering apparatus that quickly stops driving of a motor when a failure occurs in the motor that produces torque for assisting the driver's vehicle steering or in a control apparatus that controls the motor.

BACKGROUND ART

To date, various technologies for an electric power steering apparatus have been proposed. For example, Patent Document 1 discloses an integrated electric power steering apparatus in which a motor and a control apparatus that controls the motor are integrated with each other. Patent Document 2 discloses an electric power steering apparatus that continues driving of a switching device that controls a motor, for a time period from a time point when a control apparatus detects a suspicion of a short-to-ground failure to a time point when whether the suspicion of the short-to-ground failure is correct or incorrect is determined, and concurrently limits a voltage to be supplied from an electric power supply means to the switching device.

Patent Document 3 discloses an electric power steering apparatus in which while the electric power steering apparatus operates, the inherent resistance value of a motor is calculated so that when the rotation speed of the motor is the same as or lower than a predetermined value and the motor current is the same as or larger than a predetermined value, it is made possible to accurately perform decrease correction of a target current signal for driving the motor. Moreover, Patent Document 4 discloses a synchronous-motor control apparatus that includes an adaptive observer that calculates an angular frequency, an estimation current of a synchronous motor, an estimation rotor magnetic flux, and an estimation rotation speed, based on a current on a rotating 2-axis coordinates (d-q axes) and a voltage command on the rotating 2-axis coordinates (d-q axes) and an inverter that applies a voltage to the synchronous motor, based on the voltage command, and that configures the adaptive observer on the rotating 2-axis coordinates so that the synchronous motor can be controlled at a high rotation speed.

Patent Document 5 discloses an electric power steering apparatus that includes an electric-power supply unit that supplies to an AC motor high-frequency electric power on which high-frequency components corresponding to an inputted high-frequency signal are superimposed and a rotation position estimation unit that estimates a rotation position of the AC motor, and makes the rotation position estimation unit calculate the rotation position of the AC motor, based on the phase difference between an output-torque high-frequency wave included in the output torque of the AC motor and the high-frequency signal and hence accurately estimates the rotation position of the AC motor, without being restricted by the rotation speed, occurrence of magnetic-field magnetic saturation, or the like, so that the AC motor can accurately be controlled.

As described above, to date, technical development has been promoted from various points of view, and there have been proposed electric power steering apparatuses that are small-size, lightweight, and are capable of performing accurate control.

Prior Art Reference

Patent Document

[Patent Document 1] Japanese Patent Publication No. 5621598
[Patent Document 2] Japanese Patent Application Laid-Open No. 2005-212579
[Patent Document 3] Japanese Patent Publication No. 3104865
[Patent Document 4] Japanese Patent Publication No. 4672236
[Patent Document 5] International Publication No. WO 2014/080497

DISCLOSURE OF THE INVENTION

Problems to be Solved by the Invention

As is well known, an electric power steering apparatus is provided with a motor that produces torque for assisting steering by a driver who drives a vehicle and a control apparatus that controls the motor; in the case where a failure occurs in the motor or the control apparatus and hence an appropriate current cannot be supplied to the motor, there may be caused a case where there occurs a lock mode in which the motor does not rotate and hence it becomes difficult for the driver to perform intended steering. Therefore, with regard to an electric power steering apparatus, as is well known, it is required to take measures, for example, such as immediately stopping the driving of the motor, when an failure occurs in the motor or the control apparatus.

In the case where there are taken the measures of immediately stopping driving of the motor when an failure occurs in the motor or the control apparatus, the effect of a disturbance or the like that occurs with a magnitude in proportion to the current of the motor may cause so-called erroneous failure detection in which although no failure has occurred, detection of a failure is erroneously performed; thus, there has been a problem that such erroneous failure detection makes driving of the motor stop and hence the driver cannot obtain steering-power assistance by the motor. Accordingly, it is required that a failure determination means is configured in such a way that the effect of a disturbance or the like that occurs with a magnitude in proportion to the current of the motor is considered so that erroneous failure detection is prevented; however, in this case, there have been problems, for example, that when a failure actually occurs, it takes a long time before the failure is detected and that the accuracy of failure detection is deteriorated.

In the conventional electric power steering apparatus disclosed in Patent Document 2, whether or not a suspicion of a failure is correct is determined; in the case where it is determined that there exists the suspicion of a failure, driving of the motor is restricted. However, when the determination method for the suspicion of a failure, which is performed before the driving of the motor is restricted, and the failure determination method, which is performed after the driving of the motor has been restricted, are the same, the problem that it takes a long time before a failure is determined is not improved, although the effect of the failure is suppressed. In the case where as described above, the failure determination method is configured in such a way that erroneous failure detection caused by a disturbance or the like is prevented, there has been a problem that when the failure determination method and the determination method for the suspicion of a failure are the same, it takes a long time before the driving of the motor is restricted and hence the time during which the motor is locked becomes long.

The present invention has been implemented in order to solve the foregoing problem in a conventional electric power steering apparatus; the objective thereof is to obtain an electric power steering apparatus that prevents the situation in which when a failure occurs, the motor is locked and hence the steering becomes difficult and that rapidly and appropriately detects the failure and can stop the driving of the motor. Here, the detection of a failure in an appropriate manner means that when a failure occurs, the failure is securely detected and that in a normal state where no failure has occurred, no erroneous failure detection is performed.

Means for Solving the Problems

An electric power steering apparatus according to the present invention includes a torque detection unit that detects steering torque produced by a driver of a vehicle, a motor that assists steering by a driver, an assist command generation unit that generates an assist command corresponding to the steering torque, a motor driving unit that drives the motor, based on the assist command, and a failure determination unit that performs determination on a failure in the motor or the motor driving unit; the electric power steering apparatus is characterized in that when the state where steering torque detected by the torque detection unit is normal and the value thereof is the same as or larger than a predetermined threshold value continues, the assist command generation unit limits the assist command, in that the failure determination unit includes a first failure determination unit that performs determination on the failure regardless of the limitation of the assist command and a second failure determination unit that performs determination on the failure when the limitation is applied to the assist command, and in that when the second failure determination unit determines that the failure exists, the failure determination unit stops driving of the motor.

Advantage of the Invention

The present invention makes it possible to provide an electric power steering apparatus that prevents the situation in which the motor is locked and hence the steering becomes difficult and that more rapidly and appropriately detects a failure and can stop the driving of the motor.

DESCRIPTION OF EMBODIMENTS

Figure 1:
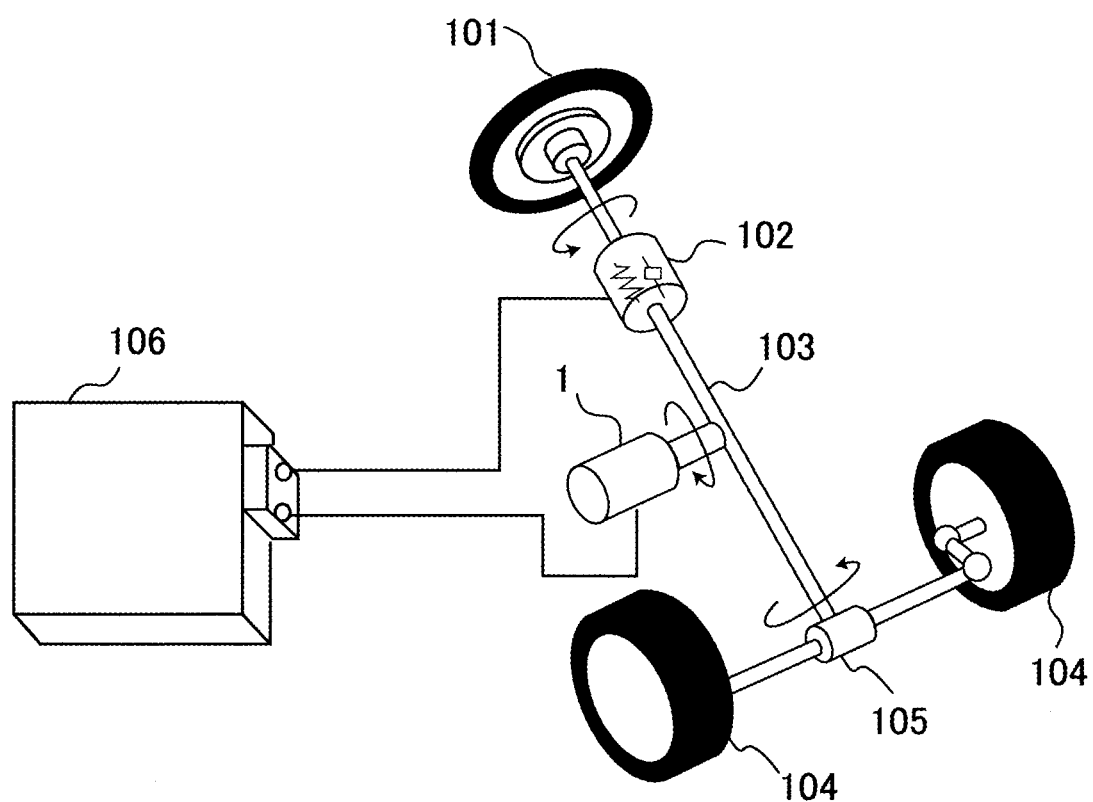
FIG. 1 is a conceptual diagram representing the overall configuration of an electric power steering apparatus according to Embodiment 1 of the present invention.

At first, there will be explained the details of the reason why in an electric power steering apparatus, determination, on a failure in the motor or the control apparatus, that is performed at a time when the motor current is small makes it possible to more quickly and appropriately detect the failure. Here, as described above, the detection of a failure in an appropriate manner means that when a failure occurs, the failure is securely detected and that in a normal state where no failure has occurred, no erroneous failure detection is performed.

A voltage equation on the d and q axes, which are the rotating two axes of a motor, is expressed by the equation (1) below.

$$\begin{bmatrix} v_d \\ v_q \end{bmatrix} = \begin{bmatrix} R+L \cdot s & -\omega L \\ \omega L & R+L \cdot s \end{bmatrix} \begin{bmatrix} i_d \\ i_q \end{bmatrix} + \omega \phi \begin{bmatrix} 0 \\ 1 \end{bmatrix} \quad (1)$$

In general, when a current control device that controls the current of a motor is designed, the responses from the voltages vd and vq, to be applied to the motor, to the currents id and iq, respectively, are considered, in many cases, based on the equation [1/(L·s+R)] including the resistance value R and the inductance L of the motor. In this situation, in the motor voltage equation expressed in the equation (1), [ω·L·id] and [ω·] are voltage disturbances on the q axis and [ω·L·iq] is a voltage disturbance on the d axis. Among these voltage disturbances, each of [ω·L·id] and [ω·L·iq] is a disturbance that is proportional to the current; thus, because the larger the current is, the larger the effect of the voltage disturbance becomes, the control accuracy of the current control device is deteriorated. The symbol · is an induced voltage constant.

When the control accuracy of the current control device is deteriorated, the current difference between a target current and an actual current, for example, becomes large. Also in the case where a failure occurs in the motor or the control apparatus and hence no appropriate current is applied to the motor, the current difference becomes large. Accordingly, there has been a problem that for example, in the case where the failure determination is performed through a failure determination method or by a failure determination means in which when the current difference is large, it is determined that a failure has occurred and the effect of the voltage disturbance in proportion to the motor current deteriorates the control accuracy, it is erroneously determined that a failure has occurred, i.e., an erroneous failure detection is performed, although no failure has occurred, and then the driving of the motor is stopped.

When the erroneous failure detection stops the driving of the motor, no steering-power assistance by the motor can be obtained and hence it is required that the driver performs steering with a large steering power; thus, the steering becomes difficult. As described above, when the effect of the voltage disturbance in proportion to the current deteriorates the control accuracy, it becomes difficult to perform the determination based on the distinction between a failure and a deterioration in the control accuracy. Therefore, in order to perform the determination based on the distinction between a failure and a deterioration in the control accuracy, it is generally implemented to adopt a failure determination method or a failure determination means for preventing the erroneous detection, in which, for example, the threshold value for determining that a failure has been detected is enlarged in consideration of the voltage disturbance.

However, when there is adopted the failure determination method or the failure determination means for preventing the erroneous detection of a failure, in which, for example, the threshold value for detecting a failure is enlarged, the failure-determination sensitivity at a time when a failure actually occurs is deteriorated; thus, the failure-detection accuracy is deteriorated, for example, it takes a long time before the failure is detected. In other words, there has been a problem that because improvement of the failure detection performance and prevention of the erroneous detection are in a trade-off relationship, it is difficult to balance them.

In contrast, when the motor current is small, the effect of the voltage disturbance in proportion to the current is small and the failure-detection accuracy is raised; thus, the probability of erroneous failure detection is extremely low and hence it is possible to set a determination condition with which a failure can accurately be determined; thus, a failure can more rapidly and appropriately be detected.

There has been generally known a method in which an estimation value of the rotation angle (hereinafter, referred to only as a motor rotation angle) of the rotor of a motor is calculated and then electric power is supplied to the motor, based on the estimation value; however, in the case where electric power is supplied to a motor, based on an estimated motor rotation angle, it should be understood that when the estimation accuracy for the motor rotation angle is deteriorated, the control performance for the motor is deteriorated. Accordingly, in the case where electric power is supplied to a motor, based on an estimated motor rotation angle, there exists a problem that it becomes further difficult to distinguish deterioration of the motor control performance caused by deterioration of the estimation accuracy for the motor rotation angle from deterioration of the motor control performance caused by a failure.

Furthermore, whatever the estimation method for the motor rotation angle is, when the estimation accuracy is deteriorated, the control performance is deteriorated; in particular, in the case where the motor rotation angle is estimated based on the current, there exists a problem that the estimation accuracy is deteriorated in inverse proportion to the value of the current and the motor control performance is deteriorated. As a method of estimating a motor rotation angle based on the current, for example, there is generally known the method in which the rotation speed and the rotation position of the motor are estimated by use of the motor induced voltage to be obtained from the motor voltage equation expressed in the foregoing equation (1). This method is to estimate the motor rotation angle by use of the fact that the motor induced voltage is proportional to the motor rotation speed, and is disclosed in each of foregoing Patent Documents 3 and 4 and the like.

Here, for simplicity, there will be explained, as an example, the case where the motor rotation angle is estimated based on the equations (2) and (3) below. A motor-rotation-angle estimation value θest is obtained by integrating a motor-rotation-speed estimation value ωest, as expressed by the equation (2) below. The motor-rotation-speed estimation value ωest is estimated based on the after-mentioned equation (3) including a voltage vq, a resistance value R and an induced voltage constant □, set as parameters, and a current iq.

$$\theta est = \int \omega est \, dt \quad (2)$$

$$\omega est = (vq - R \cdot iq)/\phi \quad (3)$$

The resistance value R, set as a parameter, includes a parameter error ΔR between the real value and the set value. The motor-rotation-speed estimation value ωest is calculate based on the resistance value R, which is set as a parameter, and the current iq; thus, the estimation error of the motor rotation angle increases in proportion to the parameter error ΔR and the current iq. As described above, in particular, in the case where the motor rotation angle is estimated based on the current, the estimation accuracy for the motor rotation angle is raised in inverse proportion to the value of the current; thus, it becomes more easy to distinguish the deterioration of the control performance caused by the deterioration of the estimation accuracy from a failure.

Next, there will be explained the fact that in the case where the steering torque produced by the driver is the same as or larger than a predetermined value, it is suspected that a failure exists in the motor or the control apparatus. Because the motor assists the steering power of the driver, the steering torque becomes the predetermined value or smaller. In this regard, however, in the case where a torque detection unit for detecting steering torque fails, the correct steering torque value cannot be obtained; thus, only when the torque detection unit is normal, the motor can appropriately assist the steering power of the driver. However, in the case where the motor or an ECU, which is a motor control apparatus, fails, the current is not appropriately supplied to the motor; thus, there has been a problem that because the motor produces torque having a direction opposite to the direction of the steering torque produced by the driver, the motor is locked and hence it is difficult for the driver to performing steering.

When the motor is locked, the steering torque value increases and becomes a predetermined value or larger, and this state continues. Accordingly, when although the motor outputs the auxiliary torque, the state where detected steering torque is normal and the steering torque value is the predetermined value or larger continues, it can be determined that there exists a suspect that the motor or the ECU, which is a control apparatus for the motor has failed; however, the torque detection unit is not involved in this determination. When the motor is locked, it is made possible to reduce the reverse-direction torque of the motor by limiting and decreasing the motor current; thus, the state where the motor is locked can be released.

Heretofore, there has been explained the reason why determination, on a failure in the motor or the control apparatus, that is performed at a time when the motor current is small makes it possible to more quickly and appropriately detect the failure.

The electric power steering apparatus according to the present invention is provided with a configuration with the foregoing problems are solved and a failure can more quickly and appropriately be detected.

Hereinafter, electric power steering apparatuses according to the present invention will be explained in accordance with respective embodiments and by use of the drawings. In each of the embodiments, the same or equivalent constituent elements are designated by the same reference characters.

Embodiment 1

FIG. 1 is a conceptual diagram representing the overall configuration of an electric power steering apparatus according to Embodiment 1 of the present invention. In FIG. 1, an electric power steering apparatus mounted in a vehicle includes a steering wheel 101, a steering shaft 103, a torque detection unit 102 as a torque detector provided on the steering shaft 103, a rack-and-pinion gear 105, wheels 104, a motor 1 that assists steering of a driver, a control apparatus (hereinafter, referred to as an ECU) 106 that supplies the motor 1 with electric power for driving the motor 1 and controls driving of the motor 1, and a torque detection unit 102 that detects steering torque produced by the driver.

In the electric power steering apparatus configured as illustrated in FIG. 1, steering torque exerted on the steering wheel 101 from an unillustrated driver is transferred to a rack in the rack-and-pinion gear 105, through the intermediaries of a torsion bar provided in the torque detection unit 102 and the steering shaft 103, so that the wheels 104 are steered.

Output torque produced by the motor 1 is transferred to the steering shaft 103 so as to reduce steering torque to be exerted by the driver during steering. As the motor 1, a publicly well-known motor such as a permanent magnet synchronous motor, a DC-brush motor, or an induction motor may be utilized. In Embodiment 1, it is assumed that the motor 1 is a 3-phase AC permanent magnet synchronous motor.

Figure 2:
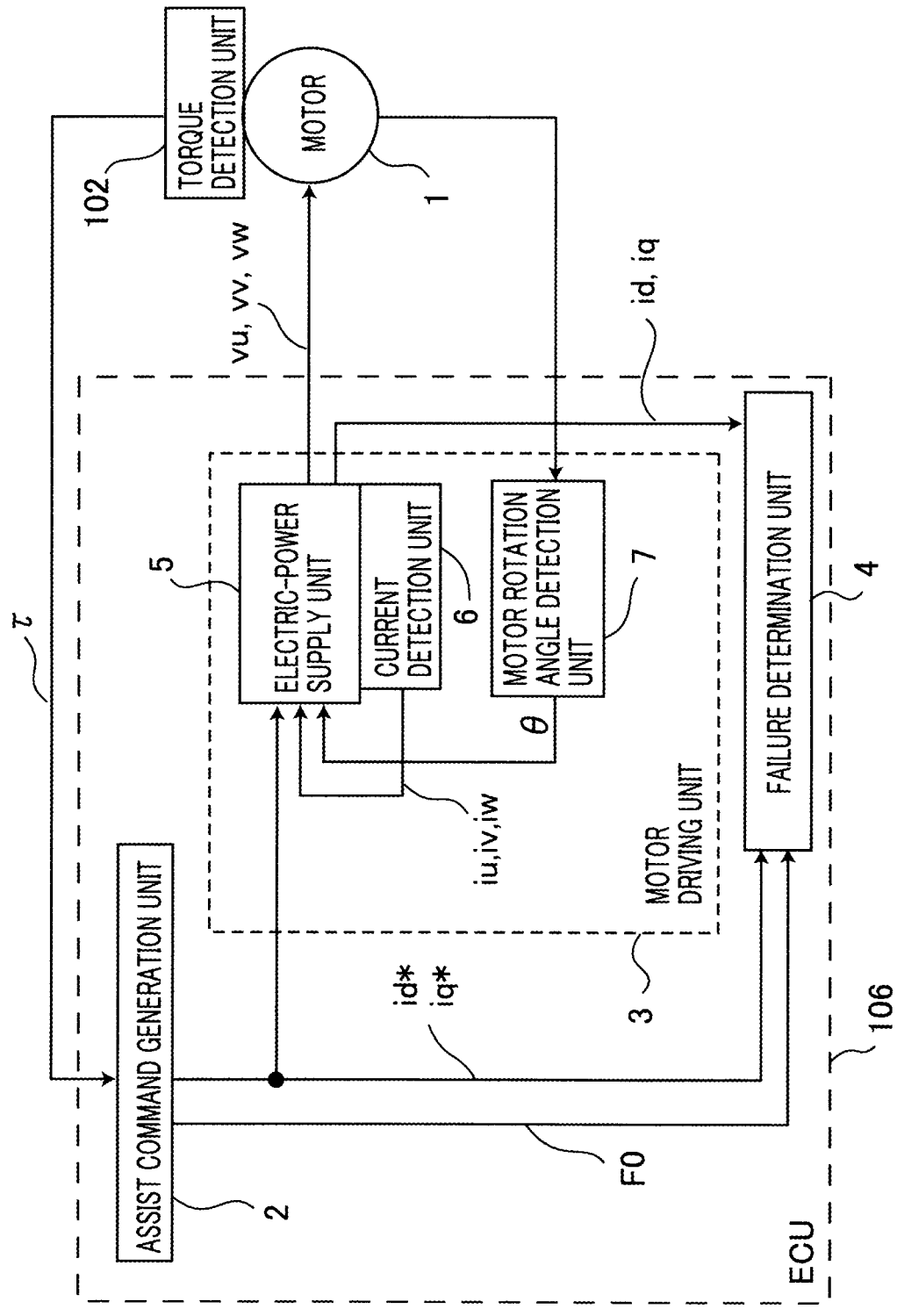
FIG. 2 is a configuration diagram of a control apparatus in the electric power steering apparatus according to Embodiment 1 of the present invention.

FIG. 2 is a configuration diagram of the control apparatus in the electric power steering apparatus according to Embodiment 1 of the present invention. In FIG. 2, ECU 106 includes an assist command generation unit 2 as an assist command generator that generates and outputs a d-axis assist command id* and a q-axis assist command iq* corresponding to steering torque τ that is produced by the driver and is detected by the torque detection unit 102, a motor driving unit 3 as a motor driver that drives the motor 1, based on the d-axis assist command id* and the q-axis assist command iq*, and a failure determination unit 4 as a failure determiner that performs determination on a failure in the motor 1 or the motor driving unit 3. The motor driving unit 3 includes an electric-power supply unit 5, a current detection unit 6 as a current detector, and a motor rotation angle detection unit 7. In the following explanations, the d-axis assist command id* and the q-axis assist command iq* may collectively be referred to only as "assist commands id* and iq*" or "assist commands".

The electric-power supply unit 5 inputs a d-axis current id and a q-axis current iq of the motor to the failure determination unit 4. The failure determination unit 4 includes a first failure determination unit as a first failure determiner and a second failure determination unit as a second failure determiner, described later. The motor rotation angle detection unit 7 detects a rotation angle θ of the rotor of the motor 1 and inputs the rotation angle θ to the electric-power supply unit 5. The motor rotation angle detection unit 7 is formed of, for example, a resolver, a rotary encoder, or the like.

In accordance with the steering torque τ inputted from the torque detection unit 102, the assist command generation unit 2 calculates the assist commands id* and iq* and then inputs the assist commands id* and iq* to the electric-power supply unit 5 and the failure determination unit 4. The method of calculating the assist commands id* and iq* is not particularly specified; however, for example, the assist command iq* is calculated in such a way that id* is set to "0" and then the steering torque τ is multiplied by a proportional gain Ka. The maximum value of each of the assist commands id* and iq* outputted by the assist command generation unit 2 is, for example, the rated current of the motor 1.

When the steering torque τ detected by the torque detection unit 102 is normal and the state where the value of the steering torque τ is the same as or larger than an aftermentioned predetermined threshold value continues, the assist command generation unit 2 limits the assist commands. The assist command generation unit 2 performs the limitation of the assist commands, for example, in such a way that iq*, which is an assist command, is limited to a value that is smaller than the maximum value of the assist command, for example, the same as or smaller than ¼ or ¹⁄₁₀ of the rated current of the motor 1, or "0". In this situation, the limitation of the assist commands may be performed in such a way that the limit values of the assist commands are instantaneously decreased or gradually decreased with time. In Embodiment 1, the limitation of the assist commands is performed in such a way that the assist commands are gradually decreased up to ¼ or smaller of the rated current of the motor 1.

The condition that suggests that the steering torque τ detected by the torque detection unit 102 is normal is not particularly specified; however, the foregoing condition suggests that the value of the steering torque τ detected by the torque detection unit 102 is the same as or smaller than a first torque threshold value β1, which is the upper limit of a normal range. When the state where the detected steering torque τ is normal and the value of the steering torque τ is the same as or larger than a second torque threshold value β2 continues, the assist command generation unit 2 limits the assist commands, on suspicion of a failure in the motor 1 or the motor driving unit 3. In this regard, however, β2 is the same as or smaller than β1. When the motor 1 or the motor driving unit 3 fails, no appropriate current can be applied to the motor 1; as a result, the steering torque becomes large. Accordingly, the second torque threshold value β2 is only necessary to be a value with which it can be determined that the steering torque produced by the driver is large; for example, the value of β2 is set to 0.9 times as large as β1. Furthermore, the assist command generation unit 2 turns on an assist command limiting flag F0 while the assist commands id* and iq* are limited, and inputs the assist command limiting flag F0 to the failure determination unit 4.

Next, the motor driving unit 3 will be explained. As described above, the motor driving unit 3 includes an electric-power supply unit 5, the current detection unit 6, and the motor rotation angle detection unit 7. Based on the assist commands id* and iq* from the assist command generation unit 2 and detected three-phase currents iu, iv, and iw, the electric-power supply unit 5 applies three-phase voltages vu, vv, and vw to the armature coil of the motor 1, which is a 3-phase AC permanent magnet synchronous motor. The current detection unit 6 detects the three-phase currents iu, iv, and iw that flow due to the application of three-phase voltages vu, vv, and vw from the electric-power supply unit 5 to the motor 1.

That is to say, based on the motor rotation angle θ detected by the motor rotation angle detection unit 7, the electric-power supply unit 5 coordinate-transforms the three-phase currents iu, iv, and iw detected by the current detection unit 6 into the d-axis current id and the q-axis current iq on the d axis and the q axis, respectively, which are rotating two axes; from the assist commands id* and iq* and the coordinate-transformed d-axis current id and q-axis current iq, the d-axis current difference $\Delta id$ (=id*−id) and the q-axis current difference $\Delta iq$ (=iq*−iq) are calculated. Furthermore, in order to perform control in such a way as to reduce the d-axis current difference $\Delta id$ and the q-axis current difference $\Delta iq$, the electric-power supply unit 5 calculates a d-axis voltage vd* and a q-axis voltage vq* on the d-axis and the q-axis, respectively, which are the rotating two axes, through the intermediary of a PI controller (unillustrated). Although in the present embodiment, the current control device is a PI controller, the current control device is not limited to a PI controller and the control method may be another control method such as PID control.

Based on the motor rotation angle θ detected by the motor rotation angle detection unit 7, the electric-power supply unit 5 coordinate-transform the d-axis voltage vd* and the q-axis voltage vq* on the d-axis and the q-axis, respectively, which are rotating two axes, into the three-phase voltages vu*, vv*, and vw*; based on the coordinate-transformed three-phase voltages vu*, vv*, and vw*, an inverter (unillustrated) applies the three-phase voltages vu, vv, and vw to the motor 1, so that the three-phase currents iu, iv, and iw are made to flow in the motor 1 and hence the motor 1 is driven.

The failure determination unit 4 includes the first failure determination unit (unillustrated) and the second failure determination unit (unillustrated). The failure determination unit 4 determines a failure in the part related to the path through which the three-phase currents iu, iv, and iw of the motor 1 flow, i.e., a failure in any one of the motor 1 and the motor driving unit 3. In the present Embodiment, a failure in the motor driving unit 3 denotes a failure in any one of the electric-power supply unit 5 and the current detection unit 6. In the case where the failure determination unit 4 determines that a failure has occurred in the part related to the path through which the three-phase currents iu, iv, and iw of the motor 1 flow, the driving of the motor 1 by the motor driving unit 3 is stopped.

In Embodiment 1, in the case where a first abnormality determination state amount based on the state of the motor driving unit 3 is larger than a first determination threshold value α1, the first failure determination unit determines that a failure has occurred in the motor 1 or the motor driving unit 3; in the case where the first abnormality determination state amount is larger than a second determination threshold value α2, the second failure determination unit determines that a failure has occurred in the motor 1 or the motor driving unit 3. Here, the second determination threshold value α2 is smaller than the first determination threshold value α1, i.e., α2<α1. The first abnormality determination state amount to be determined by the failure determination unit 4 is only necessary to be a state amount with which a failure in the part related to the path through which the three-phase currents iu, iv, and iw of the motor 1 can be determined. For example, the first abnormality determination state amounts are only necessary to be the three-phase currents iu, iv, and iw of the motor 1, the three-phase voltages vu, vv, and vw that have respective correlations with the corresponding three-phase currents iu, iv, and iw, or values related to those.

Figure 3:
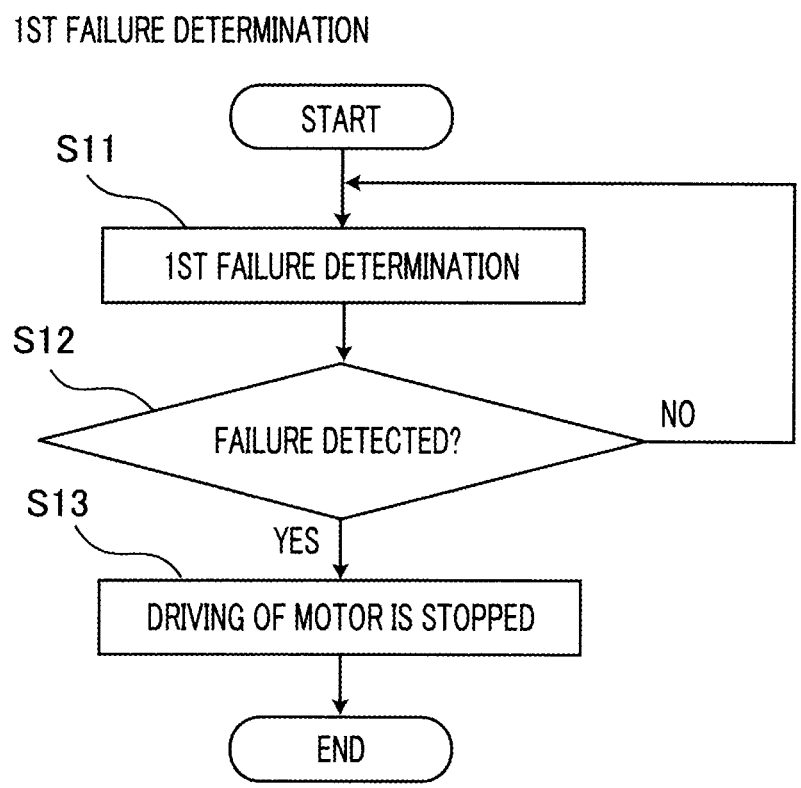
FIG. 3 is a flowchart representing the operation of a first failure determination unit in the electric power steering apparatus according to Embodiment 1 of the present invention.

FIG. 3 is a flowchart representing the operation of the first failure determination unit in the electric power steering apparatus according to Embodiment 1 of the present invention. In FIG. 3, the first failure determination unit performs a first failure determination in the step S11. In the first failure determination to be performed in the step S11, a failure is determined regardless of the values of the assist commands id* and iq*. In the first failure determination to be performed by the first failure determination unit, it is only necessary that a failure in the part related to the path through which the current of the motor 1 flows can be determined; the failure determination condition is not particularly specified. For example, in the case where when the first abnormality determination state amount is the q-axis current difference $\Delta iq$, the state where the q-axis current difference $\Delta iq$ is the same as or larger than the first determination threshold value α1 continues, it is determined that a failure has occurred. Here, the failure determination condition in the first failure determination unit is referred to as a first determination condition. The first determination condition is defined as follows.

The first determination condition: q-axis current difference $\Delta iq$>the first determination threshold value α1

In the step S11, it is determined whether or not the first determination condition is satisfied; when the first determination condition is satisfied, it is determined that a failure exists in the motor 1 or the motor driving unit 3. Next, in the step S12, it is determined whether or not the first failure determination unit has determined that a failure exists in the motor 1 or the motor driving unit 3 and has detected the failure; in the case where the first failure determination unit has detected the failure (YES), the step S12 is followed by the step S13, where the driving of the motor 1 by the motor driving unit 3 is stopped; in the case where the first failure determination unit has not detected the failure (NO), the step S11 is resumed, and the first failure determination by the first failure determination unit is repeated.

Figure 4:
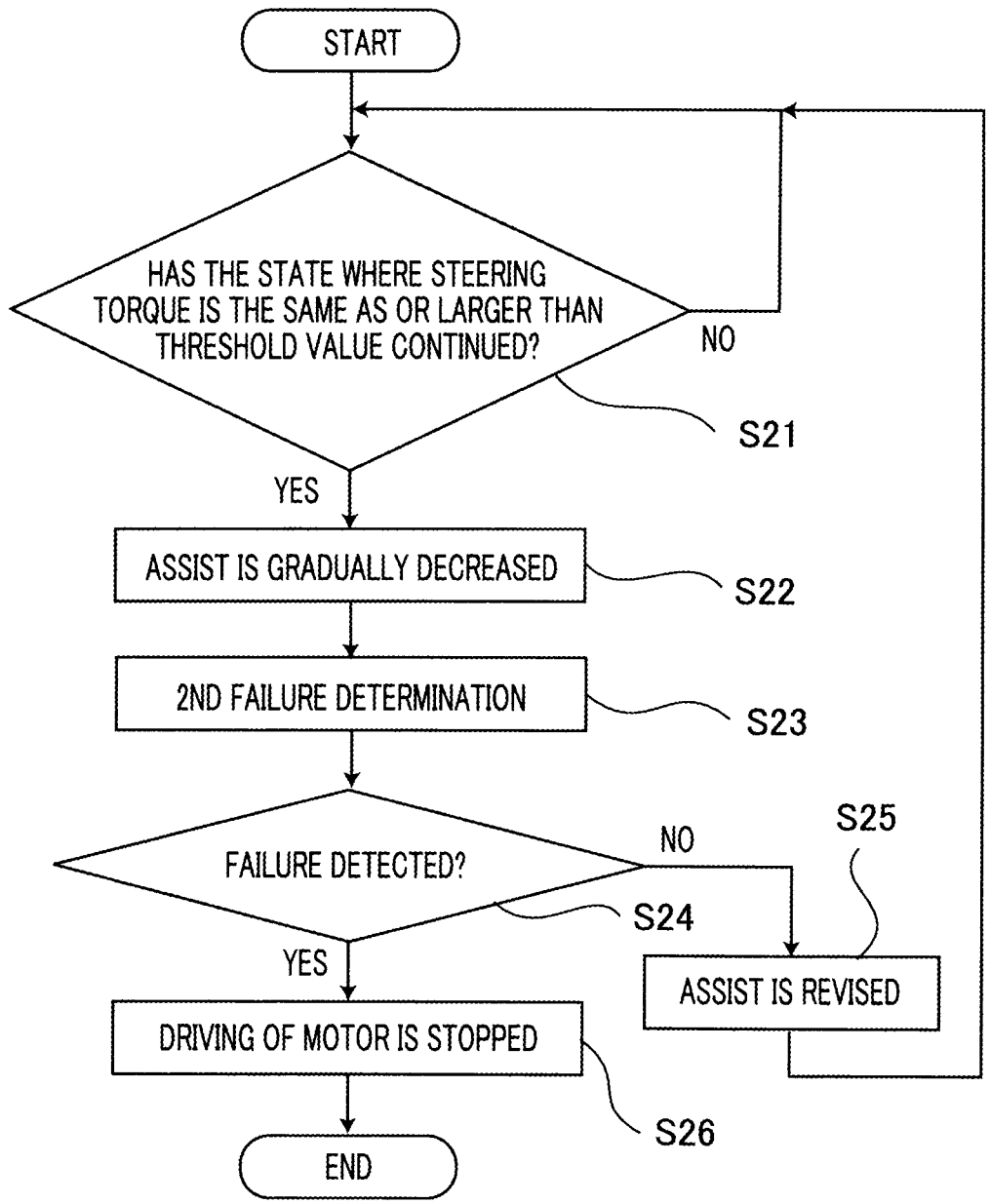
FIG. 4 is a flowchart representing the operational actions of an assist command and a second failure determination unit in the electric power steering apparatus according to Embodiment 1 of the present invention.

Next, the operation of the second failure determination unit will be explained. FIG. 4 is a flowchart representing the operational actions of the assist command and the second failure determination unit in the electric power steering apparatus according to Embodiment 1 of the present invention. In FIG. 4, in the step S21, it is determined whether or not the state where the value of the steering torque τ detected by the torque detection unit 102 is the same as or smaller than the first torque threshold value β1, which is the upper limit of a normal range, and the same as or larger than the second torque threshold value β2 has continued for a predetermined time or longer; in the case where the result of the determination is affirmative (YES), the step S21 is followed by the step S22, where the assist commands id* and iq* are gradually decreased and limited, on suspicion of a failure in the motor 1 or the motor driving unit 3. In the case where the result of the determination in the step S21 is negative (NO), the step S21 is resumed and the foregoing determination is repeated.

In the step S22, the assist commands id* and iq* are gradually decreased and limited; then, in the step S23, the second failure determination unit performs a second failure determination. The second failure determination by the second failure determination unit is performed while as described above, the assist commands id* and iq* are gradually decreased and limited. For example, after the assist commands id* and iq* are gradually decreased and limited up to ¼ of the rated current of the motor 1 or smaller, the second failure determination is performed. As is the case with the first failure determination by the first failure determination unit, the first abnormality determination state amount to be determined by the second failure determination is the q-axis current difference Δiq.

In the step S23, when the state where the q-axis current difference Δiq is the same as or larger than the second determination threshold value α2 has continued, the second failure determination unit determines that a failure exists in the motor 1 or the motor driving unit 3. In order to be a value with which a failure is more readily determined than with the first determination threshold value α1, the second determination threshold value α2 is smaller than the first determination threshold value α1, i.e., α2<α1. Here, the failure determination condition in the second failure determination unit is referred to as a second determination condition. The second determination condition is defined as follows.

The second determination condition: the q-axis current difference Δiq>the second determination threshold value α2

In the second failure determination by the second failure determination unit, the time during which the second determination condition is satisfied is measured for a first predetermined time T1; in the case where the measured time is the same as or longer than a second predetermined time T2, it is determined that a failure exists in the motor 1 or the motor driving unit 3. The measuring of this time is performed, for example, by sampling the values of the q-axis current differences Δiq with a specific time period and counting the number of instances, in each of which the second determination condition is satisfied.

The time in which the second determination condition is satisfied is not necessarily continuous; for example, the times, in each of which the second determination condition is satisfied, is integrated for the first predetermined time T1; in the case where the integrated time is the same as or longer than the second predetermined time T2, it may be determined that a failure exists in the motor 1 or the motor driving unit 3. This method makes it possible that even when for example, detection noise intrudes in the detected three-phase currents iu, iv, and iw and hence the second determination condition is temporarily unsatisfied, a failure can appropriately be determined.

Next, in the step S24, it is determined whether or not during a third predetermined time T3, the second failure determination unit has determined that a failure exists; in the case where during the third predetermined time T3, the second failure determination unit has not determined that a failure exists (NO), the step S24 is followed by the step S25, where the limitation of the assist commands is cancelled; then, the step S21 is resumed. The third predetermined time T3, described above, is set, for example, to be equal to T1 (T3=T1).

In the step S25, the limitation of the assist commands id* and iq* is cancelled and then the assist is resumed. In the cancellation of the limitation of the assist commands id* and iq*, the limit values of the assist commands id* and iq* are gradually enlarged with time, i.e., gradually increased so as to be restored to the rated values of the motor 1. Due to the cancellation of the limitation of the assist commands, the steering torque necessary for the driver to perform steering is reduced.

With regard to the cancellation of the limitation of the assist commands id* and iq*, the assist commands id* and iq* may instantaneously be restored from the limit values to the rated values of the motor 1, in the case where during the third predetermined time T3, the second failure determination unit does not determine that a failure exists. In that case, there is demonstrated an advantage that because assist for the steering torque can rapidly be obtained from the motor 1, the steering torque required for the driver to steer is reduced.

In the case where in the step S24, the during the third predetermined time T3, the second failure determination unit determines that a failure exists (YES), the step S24 is followed by the step S26, where the driving of the motor 1 by the motor driving unit 3 is stopped.

As described above, an electric power steering apparatus according to Embodiment 1 of the present invention includes a torque detection unit that detects steering torque produced by a driver, a motor that assists steering by a driver, an assist command generation unit that generates an assist command corresponding to the steering torque, a motor driving unit that drives the motor, based on the assist command, and a failure determination unit that performs determination on a failure in the motor or the motor driving unit; when the state where the steering torque detected by the torque detection unit is normal and the value of the steering torque is the same as or larger than a threshold value continues, the assist command generation unit limits the assist command; the failure determination unit includes a first failure determination unit that performs determination on the failure regardless of the limitation of the assist command and a second failure determination unit that performs determination on the failure while the assist command is limited, and stops driving of the motor when the second failure determination unit determines that there exists a failure. As a result, because the current of the motor can be reduced by limiting the assist command, the motor is prevented from being locked; concurrently, the second failure determination unit that performs determination on the failure while the assist command is limited makes it possible to prevent an erroneous detection caused by a voltage disturbance proportional to the current and to more rapidly and appropriately detect the failure.

The first failure determination unit or the second failure determination unit determines that a failure exists in the motor or the motor driving unit, when a first abnormality determination state amount based on the state of the motor driving unit is larger than a first determination threshold value or the second determination threshold value, as the case may be, and the second determination threshold value is set to a value that is smaller than the first determination threshold value; therefore, the second failure determination unit more readily determines that a failure exists than the first failure determination unit determines and hence the failure can more rapidly and appropriately be detected.

Furthermore, because in the case where while the assist command is limited, the first failure determination unit or the second failure determination unit does not determine that a failure exists during the third predetermined time T3, the assist command generation unit cancels the limitation of the assist command; thus, because when no failure exists, the limitation of the assist command is cancelled and hence the steering-power assistance by the motor can be resumed, there is demonstrated an advantage that the power required for steering is reduced.

The motor driving unit includes a current detection unit that detects the current of the motor and an electric-power supply unit that supplies electric power to the motor, based on the assist command and the detected current; because the failure determination unit performs determination on a failure in the current detection unit or the electric-power supply unit, based on the current or the voltage of the motor, a voltage disturbance proportional to the current is decreased by reducing the assist command. As a result, it is made possible to more rapidly and appropriately detect a failure in the current detection unit or the electric-power supply unit related to the current flowing path.

In the electric power steering apparatus according to Embodiment 1 of the present invention, determination on a failure is performed after the assist command is limited up to ¼ of the rated current of the motor or smaller; however, it may be allowed that the assist command is gradually decreased and limited up to "0" and that the determination of a failure is started when while gradually decreased, the assist command has been limited up to ¼ of the rated current or smaller. In that case, because the determination of a failure is started when the assist command is being gradually decreased, it is made possible to more rapidly perform the determination of a failure in comparison with the case where the assist command is limited up to "0". Moreover, because the assist command is limited to "0", which is less than ¼ of the rated current or smaller and with which the determination on a failure is readily performed, even when due to a failure, the motor performs reverse assisting, the motor is prevented from being locked by the reverse assisting.

In the electric power steering apparatus according to Embodiment 1 of the present invention, the failure determination condition is based on the current; however, the determination may be performed based on the voltage. For example, the determination may be performed based on the q-axis voltage vq* instead of the q-axis current difference Δiq. Because a voltage has the correlation with a current, determination on a failure can be performed in a manner the same as that in the case where the determination is performed based on the current.

In the electric power steering apparatus according to Embodiment 1 of the present invention, when during the third predetermined time, the second failure determination unit does not determine that a failure exists, the limitation of the assist command is cancelled; however, it may be allowed that the limitation of the assist command is not cancelled but continued. In the case where the limitation of the assist command is continued, the state where the second failure determination unit readily performs determination on a failure can be maintained; therefore, when a failure occurs, the driving of the motor can immediately be stopped.

Embodiment 2

Figure 5:
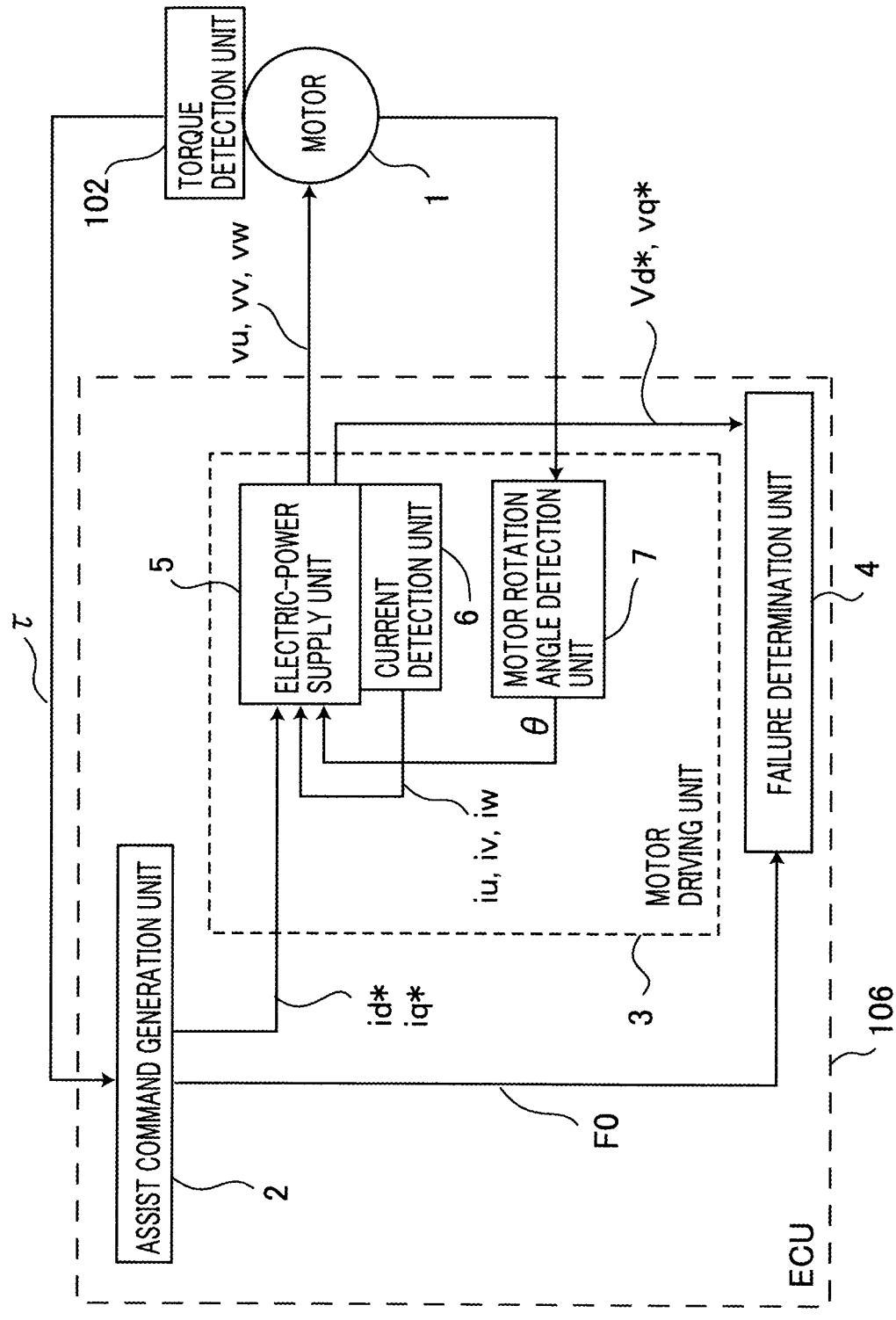
FIG. 5 is a configuration diagram of a control apparatus in an electric power steering apparatus according to Embodiment 2 of the present invention.

Next, an electric power steering apparatus according to Embodiment 2 of the present invention will be explained. FIG. 5 is a configuration diagram of the control apparatus in the electric power steering apparatus according to Embodiment 2 of the present invention. The failure determination method in Embodiment 2 differs from that in Embodiment 1; however, other configurations in Embodiment 2 are the same as those in Embodiment 1.

Hereinafter, the part, in Embodiment 2, that is different from that in Embodiment 1 will be explained.

In the case where the first abnormality determination state amount based on the state of the motor driving unit 3 is larger than the first determination threshold value α11, the first failure determination unit in the failure determination unit 4 represented in FIG. 5 determines that a failure has occurred in the motor 1 or the motor driving unit 3; in the case where the second abnormality determination state amount based on the state of the motor driving unit 3 is larger than the second determination threshold value α22, the second failure determination unit determines that a failure has occurred in the motor 1 or the motor driving unit 3; the first abnormality determination state amount and the second abnormality determination state amount are respective state amounts that are different from each other.

In the case where due to a change in the temperature, the resistance value of the motor 1 changes, the effect of a resistance-value change amount ΔR2 can be regarded as voltage disturbances [ΔR2·id] and [ΔR2·iq] that are proportional to the d-axis current id and the q-axis current iq, respectively. Therefore, in the q axis, when the assist command iq* is large, control is performed in such a way as to cancel the effect of the voltage disturbance [ΔR2·iq]; thus, the q-axis voltage vq* becomes large. Accordingly, it is desirable that while the assist command iq* is small, determination on a failure is performed. Therefore, each of the first failure determination unit and the second failure determination unit has the configuration, described below.

That is to say, the first failure determination unit performs a first failure determination, regardless of the values of the assist commands id* and iq*. In the first failure determination to be performed by the first failure determination unit, it is only necessary that a failure in the part related to the path through which the current of the motor 1 flows can be determined; the failure determination condition is not particularly specified. For example, the first abnormality determination state amount is set to the d-axis voltage vd*. When the state where the d-axis voltage vd*, which is the first abnormality determination state amount, is the same as or larger than a first determination threshold value α11 has continued, the first failure determination unit determines that a failure exists in the motor 1 or the motor driving unit 3. Here, the failure determination condition in the first failure determination unit is referred to as a first determination condition that is defined as follows.

The first determination condition: vd*>the first determination threshold value α11

As is the case with Embodiment 1, the second failure determination unit performs determination on a failure while the d-axis assist command id* and the q-axis assist command iq* are limited. For example, after the d-axis assist commands id* and the q-axis assist command iq* are gradually decreased and limited up to ¼ of the rated current of the motor 1 or smaller, the failure determination is performed. The second abnormality determination state amount is the q-axis voltage Vq*, which is an abnormality determination state amount that is different from the d-axis voltage vd* as the first abnormality determination state amount. It is considered that because the assist command id* is "0", the d-axis voltage vd* is always small and is independent from the q-axis voltage Vq*, and the determination on a failure is performed regardless of the value of the assist commands id* and iq*. However, the q-axis assist command iq* becomes large up to a value that is set as the maximum value (e.g., the rated current of the motor 1); thus, the failure determination is performed while the assist command is limited, for example, up to ¼ of the rated current of the motor 1 or smaller. When the state where the q-axis voltage vq* is the same as or larger than a second determination threshold value α22 continues, it is determined that a failure has occurred. Here, the failure determination condition in the second failure determination unit is referred to as a second determination condition that is defined as follows.

The second determination condition: vq*>the second determination threshold value α22

As described above, the first abnormality determination state amount and the second abnormality determination state amount are set to respective abnormality determination state amounts that are different from each other; thus, it is made possible to widen the range of the condition with which a failure can be detected and hence a failure is more readily detected in comparison with the case where the determination on a failure is performed only by the first failure determination unit.

As described above, an electric power steering apparatus according to Embodiment 2 of the present invention includes a torque detection unit that detects steering torque produced by a driver, a motor that assists steering by a driver, an assist command generation unit that generates an assist command corresponding to the steering torque, a motor driving unit that drives the motor, based on the assist command, and a failure determination unit that performs determination on a failure in the motor or the motor driving unit; when the state where the steering torque detected by the torque detection unit is normal and the value of the steering torque is the same as or larger than a threshold value continues, the assist command generation unit limits the assist command; the failure determination unit includes a first failure determination unit that performs determination on the failure regardless of the limitation of the assist command and a second failure determination unit that performs determination on the failure while the assist command is limited, and stops driving of the motor when the second failure determination unit determines that there exists a failure. As a result, because the current of the motor can be reduced by limiting the assist command, the motor is prevented from being locked; concurrently, the second failure determination unit that performs determination on the failure while the assist command is limited makes it possible to prevent an erroneous detection caused by the effect of a voltage disturbance proportional to the current and to more rapidly and appropriately detect the failure.

In the case where the first abnormality determination state amount based on the state of the motor driving unit is larger than the first determination threshold value, the first failure determination unit determines that a failure has occurred in the motor or the motor driving unit; in the case where the second abnormality determination state amount based on the state of the motor driving unit is larger than the second determination threshold value, the second failure determination unit determines that a failure has occurred in the motor or the motor driving unit; the first abnormality determination state amount and the second abnormality determination state amount are respective abnormality determination state amounts that are different from each other. As a result, because the second failure determination unit performs determination on a failure with a determination condition that is different from that in the first failure determination unit, it is made possible to widen the range of the condition with which a failure can be detected and hence a failure is more readily detected in comparison with the case where the determination on a failure is performed by the first failure determination unit.

Furthermore, because in the case where while the assist command is limited, the first failure determination unit or the second failure determination unit does not determine that a failure exists during the third predetermined time T3, the assist command generation unit cancels the limitation of the assist command; thus, because when no failure exists, the limitation of the assist command is cancelled and hence the steering-power assistance by the motor can be resumed, the power required for steering is reduced.

The motor driving unit includes a current detection unit that detects the current of the motor and an electric-power supply unit that supplies electric power to the motor, based on the assist command and the detected current; because the failure determination unit performs determination on a failure in the current detection unit or the electric-power supply unit, based on the current or the voltage of the motor, a voltage disturbance proportional to the current is decreased by reducing the assist command. As a result, it is made possible to more rapidly and appropriately detect a failure in the current detection unit or the electric-power supply unit related to the current flowing path.

Embodiment 3

Next, an electric power steering apparatus according to Embodiment 3 of the present invention will be explained. Embodiment 3 differs from Embodiment 1 in the configuration of an ECU, as a control apparatus; the other configurations are the same as those in Embodiment 1. Hereinafter, the part, in Embodiment 3, that is different from that in Embodiment 1 will mainly be explained.

Figure 6:
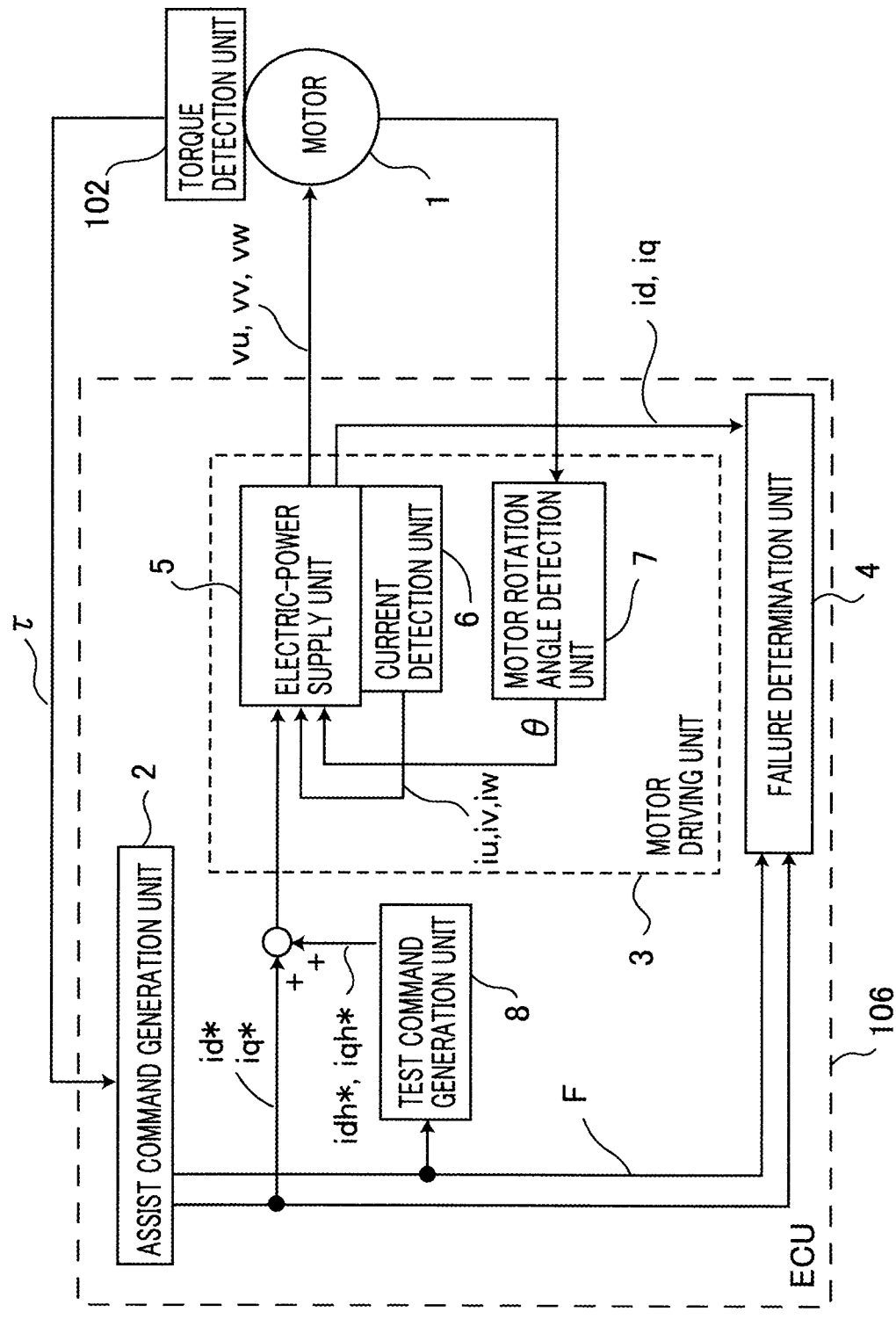
FIG. 6 is a configuration diagram of a control apparatus in an electric power steering apparatus according to Embodiment 3 of the present invention.

FIG. 6 is a configuration diagram of the control apparatus in the electric power steering apparatus according to Embodiment 3 of the present invention. In FIG. 6, the ECU 106, which is a control apparatus, has a test command generation unit 8 as a test command generator that generates test commands idh* and iqh* for performing determination on a failure, while as in the foregoing manner, the assist commands id* and iq* are limited. The motor driving unit 3 can drive the motor 1, based on the assist command to which as described later, the test commands idh* and iqh* from the test command generation unit 8 are added. In the case where the response of the motor 1 does not reflect the test commands idh* and iqh*, the second failure determination unit in the failure determination unit 4 determines that a failure exists in the motor 1 or the motor driving unit 3.

The configurations of the current detection unit 6 and the motor rotation angle detection unit 7 are the same as those in Embodiment 1. The assist command generation unit 2 is configured in the same manner as in Embodiment 1 and calculates and then outputs the assist commands id* and iq* corresponding to the steering torque T. In other words, in accordance with the steering torque τ inputted from the torque detection unit 102, the assist command generation unit 2 calculates the assist commands id* and iq* and then inputs the assist commands id* and iq* to the electric-power supply unit 5. The method of calculating the assist commands id* and iq* is not particularly specified; however, for example, the assist command iq* is calculated in such away that id* is set to "0" and then the steering torque τ is multiplied by the proportional gain Ka. The maximum value of each of the assist commands id* and iq* outputted by the assist command generation unit 2 is, for example, the rated current of the motor 1.

As is the case with Embodiment 1, when the steering torque τ detected by the torque detection unit 102 is normal and the state where the value of the steering torque τ is the same as or larger than an after-mentioned predetermined threshold value continues, the assist command generation unit 2 limits the assist commands. The assist command generation unit 2 performs the limitation of the assist commands in such a way that iq*, which is an assist command, is limited to a value that is smaller than the maximum value of the assist command, for example, the same as or smaller than ¼ or ¹⁄₁₀ of the rated current of the motor 1. In this situation, the limitation of the assist commands may be performed in such a way that the limit values of the assist commands are instantaneously decreased or gradually decreased with time. In Embodiment 3, the limitation of the assist commands is performed in such a way that the assist commands are gradually decreased to "0".

The condition that suggests that the steering torque τ detected by the torque detection unit 102 is normal is not particularly specified; however, the foregoing condition suggests, for example, that the value of the steering torque τ detected by the torque detection unit 102 is the same as or smaller than a first torque threshold value β1, which is the upper limit of a normal range. When the state where the detected steering torque τ is normal and the value of the steering torque τ is the same as or larger than a second torque threshold value β2 continues, the assist command generation unit 2 limits the assist commands, on suspicion of a failure in the motor 1 or the motor driving unit 3. In this regard, however, β2 is the same as or smaller than β1.

Furthermore, the assist command generation unit 2 turns on a test command flag F while the assist commands id* and iq* are limited, and inputs the test command flag F to the test command generation unit 8 and the failure determination unit 4. The test command flag F is a flag to apply the test commands idh* and iqh* for performing determination on a failure. For example, the test command flag F is turned on after the assist commands id* and iq* are gradually decreased and limited to "0".

When the test command flag F is ON, the test command generation unit 8 generates and outputs the test commands idh* and iqh*. In other words, the test command generation unit 8 generates the test commands idh* and iqh* while the assist commands id* and iq* are limited. Each of the test commands idh* and iqh* is a signal that corresponds to a current on a fixed-coordinate axis and whose main component has a frequency wh that is higher than the mechanical resonance frequency of the steering. For example, when it is assumed that for the steering whose mechanical resonance frequency is 10 [Hz], each of the test commands idh* and iqh* is a sinusoidal wave whose frequency is wh[wh=125 Hz] and whose amplitude is Ah, the test commands idh* and iqh* at a time point t are given by the equations (4) and (5), respectively.

$$idh^* = Ah \times \sin(wh \times t) \quad (4)$$

$$iqh^* = Ah \times \cos(wh \times t) \quad (5)$$

The test commands idh* and iqh* and the assist commands id* and iq*, respectively, are added by an adder and are inputted, as id2* (=id*+idh*) and iq2* (=iq*+iqh*), to the electric-power supply unit 5. The electric-power supply unit 5 drives the motor 1, based on the assist commands id2* (=id*+idh*) and iq2* (=iq*+iqh*) to which the respective corresponding test commands have been added.

Based on the motor rotation angle θ detected by the motor rotation angle detection unit 7, the electric-power supply unit 5 coordinate-transforms the three-phase currents iu, iv, and iw detected by the current detection unit 6 into the d-axis current id and the q-axis current iq on the d axis and the q axis, respectively, which are rotating two axes; from the assist commands id* and iq* and the coordinate-transformed d-axis current id and q-axis current iq, the d-axis current difference Δid (=id*−id) and the q-axis current difference Δiq (=iq*−iq) are calculated. Furthermore, in order to perform control in such a way as to reduce the d-axis current difference Δid and the q-axis current difference Δiq, the electric-power supply unit 5 calculates a d-axis voltage vd* and a q-axis voltage vq* on the d-axis and the q-axis, respectively, which are the rotating two axes, through the intermediary of a PI controller (unillustrated). Although in the present embodiment, the current control device is a PI controller, the current control device is not limited to a PI controller and the control method may be another control method such as PID control.

Based on the motor rotation angle θ detected by the motor rotation angle detection unit 7, the electric-power supply unit 5 coordinate-transform the d-axis voltage vd* and the q-axis voltage vq* on the d-axis and the q-axis, respectively, which are rotating two axes, into the three-phase voltages vu*, vv*, and vw*; based on the coordinate-transformed three-phase voltages vu*, vv*, and vw*, an inverter (unillustrated) applies the three-phase voltages vu, vv, and vw to the motor 1, so that the three-phase currents iu, iv, and iw are made to flow in the motor 1 and hence the motor 1 is driven.

The failure determination unit 4 includes the first failure determination unit (unillustrated) and the second failure determination unit (unillustrated). The failure determination unit 4 determines a failure in the part related to the path through which the three-phase currents iu, iv, and iw of the motor 1 flow, i.e., a failure in any one of the motor 1 and the motor driving unit 3. In the present Embodiment, a failure in the motor driving unit 3 denotes a failure in any one of the electric-power supply unit 5 and the current detection unit 6. In the case where the failure determination unit 4 determines that a failure has occurred in the part related to the path through which the three-phase currents iu, iv, and iw of the motor 1 flow, the driving of the motor 1 by the motor driving unit 3 is stopped.

The first failure determination unit is configured in the same manner as the first failure determination unit in foregoing Embodiment 1. In the case where the response of the motor 1 does not reflect the test commands idh* and iqh*, the second failure determination unit determines that a failure exists in the motor 1 or the motor driving unit 3. In Embodiment 3, in the case where the response of the motor 1 does not reflect the test commands idh* and iqh*, it is suggested that the state where the second abnormality determination state amount, which is a value related to the response of the motor 1, is smaller than the second determination threshold value γ continues for a predetermined time.

For example, as the second abnormality determination state amounts, the d-axis current id and the q-axis current iq are utilized, and the second determination threshold value γ is set to Ah/2, as a value that is smaller than the amplitude Ah of the test command. When each of the test commands idh* and iqh* is a sinusoidal wave of 125 [Hz], one period is 8 [ms]. Accordingly, in the case of the normal state where no failure exists in the motor 1 or the motor driving unit 3, the value of each of the d-axis current id and the q-axis current iq, which are the responses of the motor 1, becomes larger than the second determination threshold value γ in 4 [ms], which is the half period. In other words, when the state where during the first predetermined time T1, the d-axis current id and the q-axis current iq are smaller than the second determination threshold value γ continues for the second predetermined time T2 or longer, it is determined that a failure exists in the motor 1 or the motor driving unit 3, because the test commands idh* and iqh* are not reflected in the response of the motor 1.

It may be allowed that the d-axis current id and the q-axis current iq, which are abnormal determination state amounts, are utilized in a failure determination, after the high-frequency components thereof are extracted through filtering processing by a bandpass filter or the like. In that case, because the determination can be performed without the effects of an offset or noise, the determination on a failure can more appropriately be performed.

As is the case with Embodiment 1, in the case where the second failure determination unit does not determine that a failure exists during the third predetermined time T3, the limitation of the assist commands id* and iq* is cancelled. There is demonstrated an effect that due to the cancellation of the limitation of the assist commands id* and iq*, the steering torque necessary for the driver to perform steering is reduced.

The configuration of the electric power steering apparatus according to Embodiment 3 of the present invention, described above, brings about the following effects. That is to say, when the state where the steering torque detected by the torque detection unit is normal and the value of the steering torque is the same as or larger than a threshold value continues, the assist command is limited; the failure determination unit includes a first failure determination unit that performs determination on the failure regardless of the limitation of the assist command and a second failure determination unit that performs determination on the failure while the assist command is limited, and stops driving of the motor when the second failure determination unit determines that there exists a failure. As a result, because the limitation of the assist command makes it possible to reduce the current of the motor, the motor is prevented from being locked; concurrently, the second failure determination unit that performs determination on the failure while the assist command is limited makes it possible to prevent an erroneous detection caused by the effect of a voltage disturbance proportional to the current and to more rapidly and appropriately detect the failure.

There is provided a test command generation unit that generates a test command for performing determination on the failure, while the assist commands are limited; the motor driving unit drives the motor, based on the test command; in the case where the response of the motor does not reflect the test command, the second failure determination unit determines that a failure exists in the motor or the motor driving unit. As a result, the second failure determination unit, which performs determination on a failure by use of the test command, more readily performs determination on a failure than the first failure determination unit. Because the assist command is made small, the response based on the test command is more readily extracted and hence an erroneous determination becomes unlikely to occur.

Moreover, because the test command has its main component having a frequency higher than the mechanical resonance frequency of the steering, the effect thereof to steering is suppressed in comparison with the case where a lower frequency is applied.

In the case where the motor current is smaller than a predetermined value, the second failure determination unit determines that a failure exists; thus, it can be determined that there exists a failure, because while driving is performed based on the test command, the response of the motor does not reflect the test command.

Because in the case where while the assist command is limited, the first failure determination unit or the second failure determination unit does not determine that a failure exists during the third predetermined time T3, the assist command generation unit cancels the limitation of the assist command; thus, because when no failure exists, the limitation of the assist command is cancelled and hence the steering-power assistance by the motor can be resumed, the power required for steering is reduced.

Furthermore, the motor driving unit includes a current detection unit that detects the current of the motor and an electric-power supply unit that supplies electric power to the motor, based on the assist command and the detected current; because the failure determination unit performs determination on a failure in the current detection unit or the electric-power supply unit, based on the current or the voltage of the motor, a voltage disturbance proportional to the current is decreased by reducing the assist command. As a result, it is made possible to more rapidly and appropriately detect a failure in the current detection unit or the electric-power supply unit related to the current flowing path.

In the foregoing description, each of the test commands idh* and iqh* is a sinusoidal wave of 125 [Hz]; however, the test command is not limited to a sinusoidal wave, and there may be utilized any signal whose main component has a frequency higher than the mechanical resonance frequency of the steering. For example, also when each of the test commands idh* and iqh* is configured with a sawtooth wave, a triangular wave, a rectangular wave, a pulse waveform, or the like, the failure determination can be performed in the same manner. The frequency of each of the test commands idh* and iqh* is not limited to 125 [Hz] whose one period is 8 [ms]; the frequency thereof may be any frequency higher than the mechanical resonance frequency of the steering. For example, the frequency thereof may be either 62.5 [Hz] whose one period is 16 [ms] or 250 [Hz] whose one period is 4 [ms].

Embodiment 4

Next, an electric power steering apparatus according to Embodiment 4 of the present invention will be explained. Embodiment 4 is different from Embodiment 3 in terms of the configurations of the test command generation unit and the second failure determination unit; other configurations are the same as those in Embodiment 3.

Figure 7:
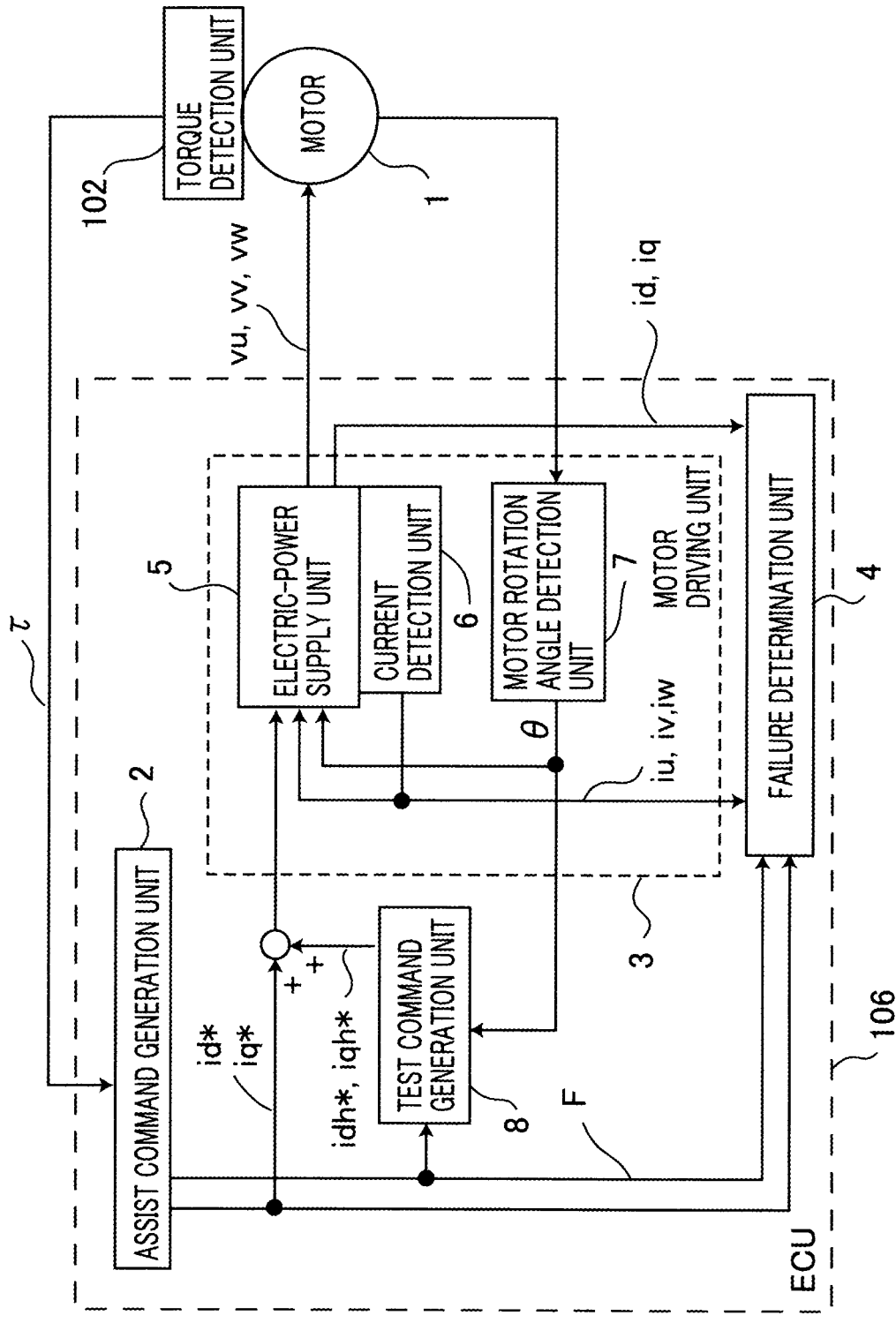
FIG. 7 is a configuration diagram of a control apparatus in an electric power steering apparatus according to Embodiment 4 of the present invention.

FIG. 7 is a configuration diagram of the control apparatus in the electric power steering apparatus according to Embodiment 4 of the present invention. In FIG. 7, when the test command flag F is ON, the test command generation unit 8 generates the test commands iah* and ibh* by use of the motor rotation angle θ detected by the motor rotation angle detection unit 7. In other words, the test commands iah* and ibh* on the fixed-coordinate axis, expressed by the following equations (6) and (7), are converted, through the equation (8) below, into the idh* and iqh* on the d axis and the q axis, which are rotating two axes, based on the detected motor rotation angle θ, and are utilized as the test commands.

$$iah^* = Ah \times \sin(wh \times t) \tag{6}$$

$$ibh^* = Ah \times \cos(wh \times t) \tag{7}$$

$$\begin{bmatrix} i_{dh}^* \\ i_{qh}^* \end{bmatrix} = \begin{bmatrix} \cos\theta & \sin\theta \\ -\sin\theta & \cos\theta \end{bmatrix} \begin{bmatrix} i_{ah^*} \\ i_{bh^*} \end{bmatrix} \tag{8}$$

Because as described above, as the test commands, idh* and iqh* obtained by coordinate-transforming the fixed-coordinate currents iah* and ibh* are provided, sinusoidal-wave signals of a predetermined frequency wh can be provided to the currents of the respective phases and hence determination on a failure can be performed from the currents of the respective phases.

The second failure determination unit measures a time A in which during the first predetermined time T1, each of the three-phase currents iu, iv, and iw becomes the same as or larger than a positive threshold value a and a time B in which each of the three-phase currents iu, iv, and iw becomes the same as or smaller than a negative threshold value b; in the case where the time A or the time B is the same as or shorter than the second predetermined time T2, the second failure determination unit determines that a failure exists in the motor 1 or the motor driving unit 3, because the response of the motor does not reflect the test command. Accordingly, in the failure determination by the second failure determination unit, in the case where the value of each of the three-phase currents iu, iv, and iw is smaller than a predetermined value, it can be determined that there exists a failure, because the response of the motor does not reflect the test command. Furthermore, with regard to the three-phase currents iu, iv, and iw, it is made possible to make a distinction between a failure related to the positive side and a failure related to the negative side.

As the second abnormality determination state amounts, the three-phase currents iu, iv, and iw are utilized, and the second determination threshold value γ is set to, for example, Ah/2, as a value that is smaller than the amplitude Ah of the test command. In the case where the each of the three-phase currents iu, iv, and iw is the same as or smaller than the second determination threshold value γ, it can be determined that a failure exists in the motor 1 or the motor driving unit 3, because the response of the motor does not reflect the test commands.

Furthermore, the method described below makes it possible to perform a failure determination while making a distinction between a failure related to the positive side and a failure related to the negative side. In other words, for example, when each of the test commands iah* and ibh* is a sinusoidal wave of 125 [Hz], one period thereof is 8 [ms]; thus, the first predetermined time T1 is set to 8 [ms]. Hereinafter, as an example, the current iu will be explained; however, the same determination method can be applied also to the currents iv and iw. Assuming that a positive threshold value a is Ah/2, the time A in which the current iu is the same as or larger than the positive threshold value a is measured. The second predetermined time T2 is only necessary to be a value with which it can be determined that the time in which the current iu is positive is short. For example, in the case where each of the test commands iah* and ibh* is a sinusoidal wave whose one period is 8 [ms], the time in which the current iu is the same as or larger than Ah/2 in one period becomes 8/3 [ms]. Therefore, the second predetermined time T2 is set to 2 [ms], which is the same as or smaller than 8/3 [ms], and when the time in which the current iu is positive is the same as or shorter than 2 [ms], it is determined that the failure relates to the flowing path of the positive-side current out of the current iu, because the time in which the current iu is positive is short. Also in the case of a failure related to the negative side, the time B in which the current iu is the same as or smaller than the negative threshold value b[b=−Ah/2] is measured and then the determination on a failure is performed. When the second failure determination unit determines that a failure exists, the driving of the motor 1 is stopped.

It may be allowed that in the case where a failure determination during the first predetermined time T1 is repeated N times and determination that there exists a failure occurs N2 times or more in the time [the first predetermined time T1× N], the driving of the motor 1 is stopped. In this situation, N2 is, for example, N/2, N/3, or the like. In this regard, however, each of N and N2 is an integer. As is the case with Embodiment 1, in the case where the second failure determination unit does not determine that a failure exists during the third predetermined time T3, the limitation of the assist commands is cancelled. The third predetermined time T3 is, for example, T1×N.

Because the foregoing electric power steering apparatus according to Embodiment 4 of the present invention is configured in such a manner as described above, the following effects are obtained. That is to say, when the state where the steering torque detected by the torque detection unit is normal and the value of the steering torque is the same as or larger than a threshold value continues, the assist command is limited; the failure determination unit includes a first failure determination unit that performs determination on the failure regardless of the limitation of the assist command and a second failure determination unit that performs determination on the failure while the assist command is limited, and stops driving of the motor when the second failure determination unit determines that there exists a failure. As a result, because the limitation of the assist command makes it possible to reduce the current of the motor, the motor is prevented from being locked; concurrently, the second failure determination unit that performs determination on the failure while the assist command is limited makes it possible to prevent an erroneous detection caused by the effect of a voltage disturbance proportional to the current and to more rapidly and appropriately detect the failure.

There is provided a test command generation unit that generates a test command for performing determination on the failure, while the assist commands are limited; the motor driving unit drives the motor, based on the test command; in the case where the response of the motor does not reflect the test command, the second failure determination unit determines that a failure exists in the motor or the motor driving unit. As a result, the second failure determination unit, which performs determination on a failure by use of the test command, more readily performs determination on a failure than the first failure determination unit. Because the assist command is made small, the response based on the test command is more readily extracted and hence an erroneous determination becomes unlikely to occur.

Moreover, because the test command has its main component having a frequency higher than the mechanical resonance frequency of the steering, the effect thereof to steering is suppressed in comparison with the case where a lower frequency is applied.

In the case where the motor current is smaller than a predetermined value, the second failure determination unit determines that a failure exists; thus, it can be determined that there exists a failure, because while driving is performed based on the test command, the response of the motor does not reflect the test command.

Furthermore, the second failure determination unit measures a time A in which during the first predetermined time T1, the currents of the respective phases become the same as or larger than a positive threshold value a and a time B in which the currents of the respective phases become the same as or smaller than a negative threshold value b; in the case where the time A or the time B is the same as or shorter than the second predetermined time T2, the second failure determination unit determines that a failure exists; thus, when the time A in which the response of the test command is the same as or larger than the threshold value a, which is a positive value, is shorter than the second predetermined time T2, it can be determined that there exists a failure in which the current is not appropriately supplied in the positive direction. Similarly, there can also be determined a failure in which the current is not appropriately supplied in the negative direction; therefore, it is made possible to determine in which direction, i.e., in the positive or negative direction, a failure exists.

Because in the case where while the assist command is limited, the first failure determination unit or the second failure determination unit does not determine that a failure exists during the third predetermined time T3, the assist command generation unit cancels the limitation of the assist command; thus, because when no failure exists, the limitation of the assist command is cancelled and hence the steering-power assistance by the motor can be resumed, the power required for steering is reduced.

The motor driving unit includes a current detection unit that detects the current of the motor and an electric-power supply unit that supplies electric power to the motor, based on the assist command and the detected current; because the failure determination unit performs determination on a failure in the current detection unit or the electric-power supply unit, based on the current or the voltage of the motor, a voltage disturbance proportional to the current is decreased by reducing the assist command. As a result, it is made possible to more rapidly and appropriately detect a failure in the current detection unit or the electric-power supply unit related to the current flowing path.

Embodiment 5

Next, an electric power steering apparatus according to Embodiment 5 of the present invention will be explained. Embodiment 5 is different from Embodiment 4 in terms of the configurations of the motor driving unit and the test command generation unit in the ECU, which is a control apparatus; other configurations are the same as those in Embodiment 4.

Figure 8:
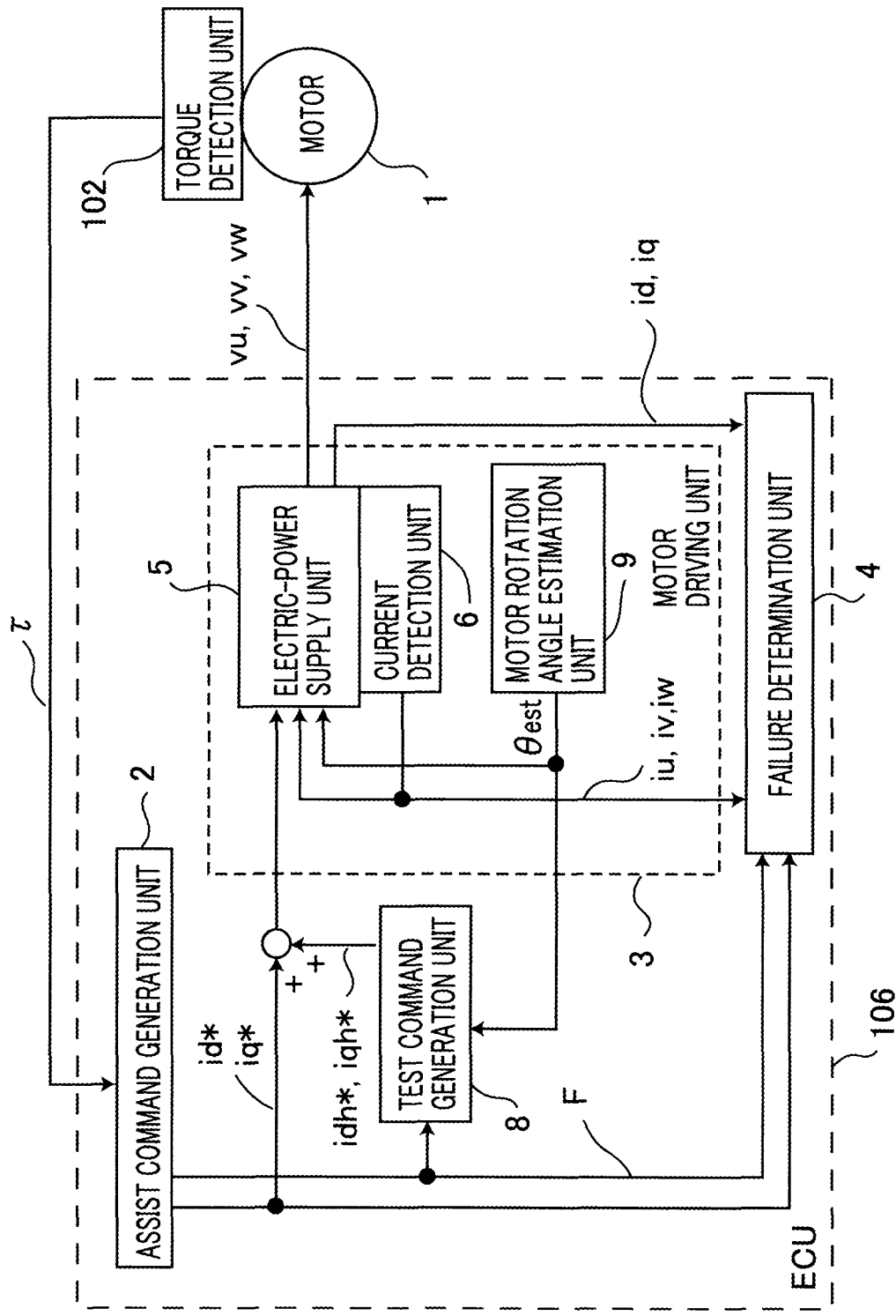
FIG. 8 is a configuration diagram of a control apparatus in an electric power steering apparatus according to Embodiment 5 of the present invention.

FIG. 8 is a configuration diagram of the control apparatus in the electric power steering apparatus according to Embodiment 5 of the present invention. In FIG. 8, Embodiment 5 is different from Embodiment 4 in that there is provided a motor rotation angle estimation unit 9 as a motor rotation angle estimator that calculates an estimation value of the rotation angle of the motor 1 and in that based on a calculated motor rotation angle estimation value best, the test commands idh* and iqh* are generated and electric power is supplied to the motor 1.

The motor driving unit 3 includes the electric-power supply unit 5, the current detection unit 6, and the motor rotation angle estimation unit 9. The current detection unit 6 is configured in the same manner as the current detection unit in foregoing Embodiment 4. In Embodiment 5, instead of the motor rotation angle detection unit, the motor rotation angle estimation unit 9 that calculates the motor rotation angle estimation value θest is provided in the motor driving unit 3. The configuration of the motor rotation angle estimation unit 9 is not particularly specified; however, for example, as disclosed in Patent Document 4, the motor rotation angle is estimated based on the current.

When the test command flag F is ON, the test command generation unit 8 coordinate-transforms the test commands iah* and ibh* on the fixed-coordinate axes, represented in the foregoing equations (6) and (7), into idh* and iqh* on the d axis and the q axis, respectively, which are rotating two axes, by use of the motor rotation angle estimation value θest, calculated by the motor rotation angle estimation unit 9, instead of the motor rotation angle θ represented in the foregoing equation (8), and idh* and iqh* are utilized as the test commands; this particular configuration is different from the configuration of the test command generation unit in foregoing Embodiment 4.

Based on the motor rotation angle estimation value θest estimated by the motor rotation angle estimation unit 9, the electric-power supply unit 5 supplies electric power to the motor 1. In other words, the electric-power supply unit 5 coordinate-transforms the three-phase currents iu, iv, and iw detected by the current detection unit 6 into the current id and the current iq on the d axis and the q axis, respectively, which are rotating two axes, based on the motor rotation angle estimation value θest estimated by the motor rotation angle estimation unit 9. As is the case with Embodiment 2, the voltages vd* and vq* are calculated based on the currents id and iq. Based on the estimated motor rotation angle estimation value θest, the d-axis voltage vd* and the q-axis voltage vq* on the d axis and the q axis, respectively, which are rotating two axes, are coordinate-transformed into the three-phase voltages vu*, vv*, and vw*. The inverter applies a voltage to the motor 1, based on the coordinate-transformed three-phase voltages vu*, vv*, and vw*, so that a the motor is energized and hence the motor is driven.

In the case where as described above, the motor rotation angle is estimated and the motor is driven based on the estimated motor rotation angle, there exists a problem that the control accuracy is deteriorated not only by a voltage disturbance proportional to the current but also by the occurrence of an estimation error proportional to the current; however, because the electric power steering apparatus according to Embodiment 5 of the present invention includes, in the motor driving unit, a motor rotation angle estimation unit that calculates an estimation value of the motor rotation angle, and supplies electric power based on the estimated motor rotation angle, the effects of a voltage disturbance proportional to the current and an error in estimating the motor rotation angle can be reduced, in addition to the effects that are the same as those in Embodiment 4; concurrently, the second failure determination unit that performs determination on a failure while the assist command is limited makes it possible to perform a determination while making an accurate distinction between the deterioration in the control accuracy, caused by a voltage disturbance proportional to the current and an error in estimating the motor rotation angle and a failure in the motor or the motor driving unit. Therefore, it is made possible to more rapidly and appropriately detect a failure in the motor or the motor driving unit and to stop the driving of the motor.

In the foregoing configuration, the motor rotation angle estimation unit is configured as disclosed in Patent Document 4; however, as disclosed in Patent Document 5, another configuration also demonstrates the same effect as Embodiment 5 does, for example, based on the phase difference between the output torque frequency included in the output torque of the motor and the high-frequency signal, the motor rotation angle position is estimated. In particular, in the case where when as in the motor rotation angle estimation apparatus disclosed in Patent Document 4, an estimation error occurs in proportion to the current, the motor rotation angle estimation unit according to Embodiment 5 is utilized, a more prominent effect is obtained.

Embodiment 6

Next, an electric power steering apparatus according to Embodiment 6 of the present invention will be explained. In addition to the configuration of Embodiment 5, the motor driving unit in Embodiment 6 includes a motor rotation angle detection unit that detects the rotation angle of a motor and an angle detection failure determination unit that performs determination on a failure in the motor rotation angle detection unit. Furthermore, the motor driving unit and the test command generation unit differ from those in foregoing Embodiment 5 in that in the case where the motor rotation angle detection unit is normal, coordinate transformation in the electric-power supply unit is performed based on a detected motor rotation angle and in that in the case where the angle detection failure determination unit determines that a failure exists in the motor rotation angle detection unit, coordinate transformations in the electric-power supply unit and the test command generation unit are performed based on a motor rotation angle estimated by the motor rotation angle estimation unit; however, other configurations are the same as those in Embodiment 5. In the explanation below, Embodiment 6 will be described by use of FIG. 8 in foregoing Embodiment 5.

Here, at first, the case where the motor rotation angle detection unit is normal will be explained. In the case where the motor rotation angle detection unit is normal, the electric-power supply unit 5 performs, as is the case with Embodiment 2, coordinate transformation between the three phases and the d and q axes, which are rotating two axes, based on the detected motor rotation angle θ, and then supplies electric power to the motor. In the case where the motor rotation angle detection unit is normal, the limitation of the assist current, based on the steering torque, is not performed. In the failure determination unit 4, the first failure determination unit according to Embodiment 1 performs determination on a failure in the part related to the flowing path of the current of the motor 1.

Next, the case where a failure exists in the motor rotation angle detection unit will be explained. The angle detection failure determination unit determines whether or not a failure exists in the motor rotation angle detection unit. The determination condition is not particularly specified; it is only necessary that a failure in the motor rotation angle detection unit can appropriately be detected. For example, the motor rotation angle is estimated in a manner the same as that described in Embodiment 5, and in the case where the absolute value of the difference between the detected motor rotation angle and the estimated motor rotation angle is the same as or larger than a threshold value, it is determined that a failure exits.

When the angle detection failure determination unit determines that a failure exists in the motor rotation angle detection unit, the motor rotation angle estimation unit 9 calculates an motor-rotation-angle estimation value. The estimation of the motor rotation angle is performed in a manner the same as that described in Embodiment 5. The electric-power supply unit 5 performs, as is the case with Embodiment 5, coordinate transformation between the three phases and the d and q axes, which are rotating two axes, based on the estimated motor rotation angle instead of the detected motor rotation angle, and then supplies electric power to the motor.

As is the case with Embodiment 5, the test command generation unit 8 coordinate-transforms the test commands iah* and ibh* on the fixed-coordinate axes into the test commands idh* and iqh* on the d axis and the q axis, which are rotating two axes, based on the estimated motor rotation angle.

When the state where a failure exists in the motor rotation angle detection unit, the steering torque τ detected by the torque detection unit 102 is normal, and the value of the steering torque τ is the same as or larger than a threshold value continues, the assist command generation unit 2 limits the assist command.

In the failure determination unit 4, the first failure determination unit and the second failure determination unit according to Embodiment 2 perform determination on a failure in the part related to the flowing path of the current of the motor, i.e., a failure in the motor, the current detection unit, or the electric-power supply unit.

As described above, in the electric power steering apparatus according to Embodiment 6 of the present invention, the motor driving unit includes a motor rotation angle detection unit that detects the rotation angle of the motor, an angle detection failure determination unit that performs determination on a failure in the motor rotation angle detection unit, and a motor rotation angle estimation unit that calculates an estimation value of the rotation angle of the motor; in the case where the motor rotation angle detection unit is normal, the motor driving unit supplies electric power, based on the detected motor rotation angle, and in the case where the angle detection failure determination unit determined that a failure exists, the motor driving unit supplies electric power, based on the estimated motor rotation angle; when the state where a failure exists in the motor rotation angle detection unit, the steering torque detected by the torque detection unit is normal, and the value of the steering torque is the same as or larger than a threshold value continues, the assist command generation unit limits the assist command. As a result, in addition to the effect of Embodiment 5, assist by the motor can be continued, because even when the motor angle detection unit fails, the motor can be driven, as backup control, based on the motor rotation angle estimated by the motor angle estimation unit.

Furthermore, in the case where the motor angle detection unit fails and the motor is driven based on an estimated motor rotation angle, the second failure determination unit performs determination on a failure while the assist command is limited, as is the case with Embodiment 5; thus, because after the backup control starts, it is made possible to make a distinction between control-accuracy deterioration caused by an error in the estimated angle and the failure and hence it is made possible to appropriately perform determination on a failure. Therefore, it is facilitated to perform determination on a failure in the motor, the current detection unit, or the electric-power supply unit; thus, in the case where a failure exists, it is made possible to rapidly detects the failure and to stop the driving of the motor; concurrently, in the case where no failure exists, it can be prevented that it is erroneously determined that a failure exists.

Embodiment 7

Next, an electric power steering apparatus according to Embodiment 7 of the present invention will be explained. Embodiment 7 is different from Embodiment 1 in that the second failure determination unit is provided with a normality determination unit as a normality determiner that determines whether or not the determination subject has no failure and is normal; other configurations are the same as those in Embodiment 1. In Embodiment 7, a normality determination unit as a normality determiner that determines whether or not the determination subject of the second failure determination unit is normal is added to the second failure determination unit in the configuration of foregoing Embodiment 1. In the case where the normality determination unit determines that the determination subject of the second failure determination unit is normal, the limitation of the assist commands are cancelled. For example, it is adopted, as the normality determination condition, that the q-axis current difference Δiq is smaller than a normality determination threshold value α3; when the normality determination condition is satisfied for a fourth predetermined time T4 or longer, the normality determination unit determines that the determination subject of the second failure determination unit is normal. In this embodiment, as represented below, the normality determination threshold value α3 is smaller than the second determination threshold value α2, i.e., α3<α2.

normality determination condition: q-axis current difference Δiq <normality determination threshold value α3

Because the fourth predetermined time T4 is set to a time shorter than the third predetermined time T3 and when the normality determination unit determines that the determination subject is normal, the limitation of the assist commands is cancelled, the torque assistance by the motor is further rapidly obtained; thus, there is demonstrated an advantage that the steering torque required for the driver to steer is reduced.

As described above, in the electric power steering apparatus according to Embodiment 7 of the present invention, the second failure determination unit has a normality determination unit that determines, during the limitation of the assist commands, whether or not the motor or the motor driving unit has no failure and is normal; in the case where after the assist commands are limited, the first failure determination unit or the second failure determination unit does not determine that a failure exists during a predetermined time or determines that no abnormality exists, the assist command generation unit cancels the limitation of the assist commands. As a result, there is obtained an effect that the normality determination unit makes it possible that when not failure exists, the assist can more rapidly be resumed.

In Embodiment 7, the normality determination unit is added to the configuration of Embodiment 1; however, even when the normality determination unit is provided in any other Embodiment, the same effect is obtained.

Embodiment 8

Figure 9:
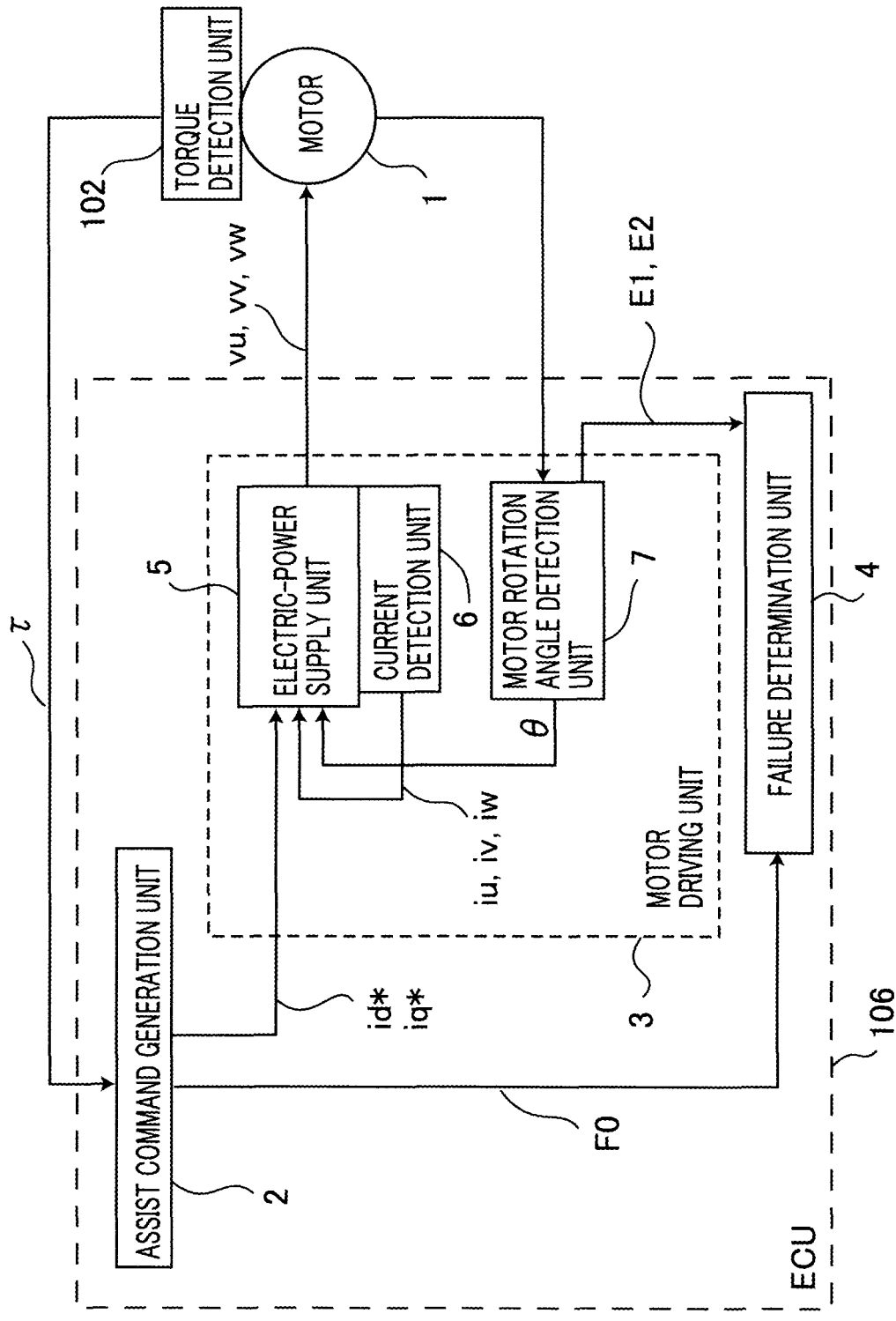
FIG. 9 is a configuration diagram of a control apparatus in an electric power steering apparatus according to Embodiment 8 of the present invention.

Next, an electric power steering apparatus according to Embodiment 8 of the present invention will be explained. FIG. 9 is a configuration diagram of the control apparatus in the electric power steering apparatus according to Embodiment 8 of the present invention. Embodiment 8 differs from Embodiment 1 in terms of the configuration of the failure determination unit in the ECU, which is a control apparatus; other configurations in Embodiment 8 are the same as those in Embodiment 1.

In FIG. 9, the failure determination unit 4 in Embodiment 8 performs determination on a failure in the motor rotation angle detection unit 7. The motor rotation angle detection unit 7 is formed of, for example, a resolver that detects the motor rotation angle θ from two kinds of AC voltages E1 and E2 having different phases; the AC voltages E1 and E2 and the motor rotation angle θ are expressed in the equations (9), (10), and (11) below.

$$E1 = Ar \times \sin\theta \quad (9)$$

$$E2 = Ar \times \cos\theta \quad (10)$$

$$\theta = \arctan(E1/E2) \quad (11)$$

The failure determination unit 4 performs determination on a failure in the motor rotation angle detection unit, based on, for example, the amplitudes of the AC voltages E1 and E2. In this regard, however, when the assist command is large, electromagnetic noise caused by the motor current is large; thus, noise that is added to the signal of the motor rotation angle detection unit 7 becomes large. When the noise that is added to the signal of the motor rotation angle detection unit is large, it may be erroneously determined that a failure exists in the motor rotation angle detection unit. Accordingly, when the state where the steering torque detected by the torque detection unit is normal and the value of the steering torque is the same as or larger than a threshold value continues, the assist command generation unit limits the assist command on suspicion of a failure in the motor rotation angle detection unit.

When as described below, the first determination condition based on a first determination threshold value Ath1 is continuously satisfied for a predetermined time, the first failure determination unit determines that a failure exists.

first determination condition: $|E1^2 + E2^2| > Ath1$

When as described below, during the limitation of the assist commands, the second determination condition based on a second determination threshold value Ath2 is continuously satisfied for a predetermined time, the second failure determination unit determines that a failure exists. In this regard, however, because the limitation of the assist command reduces the current to be energized to the motor and hence the noise that is added to the signal of the motor rotation angle detection unit becomes small, the second determination threshold value Ath2 is set to a value smaller than the first determination threshold value Ath1, i.e., Ath2<Ath1.

second determination condition: $|E1^2 + E2^2| > Ath2$

As described above, the electric power steering apparatus according to Embodiment 8 of the present invention includes a torque detection unit that detects steering torque produced by a driver, a motor that assists steering by a driver, an assist command generation unit that generates an assist command corresponding to the steering torque, a motor driving unit that drives the motor, based on the assist command, and a failure determination unit that performs determination on a failure in the motor or the motor driving unit; when the state where the steering torque detected by the torque detection unit is normal and the value of the steering torque is the same as or larger than a threshold value continues, the assist command generation unit limits the assist command; the failure determination unit includes a first failure determination unit that performs determination on the failure during the limitation of the assist command and a second failure determination unit that performs determination on the failure when the value of the assist command is small, and stops driving of the motor when the second failure determination unit determines that there exists a failure.

Furthermore, the motor driving unit includes a current detection unit that detects the current of the motor, a motor rotation angle detection unit that detects the rotation angle of the motor, and an electric-power supply unit that supplies electric power to the motor, based on the assist command, the detected current, and the detected motor rotation angle; the failure determination unit performs determination on a failure in the current detection unit, the electric-power supply unit, or the motor rotation angle detection unit. Because the assist commands are limited through this configuration, the motor can be prevented from being locked when a failure causes reverse assisting. Moreover, the limitation of the assist commands makes it possible to reduce the effect of electromagnetic noise to the motor angle detection unit; therefore, the determination threshold value in the second failure determination unit can be set to a value smaller than the first determination threshold value and hence determination on a failure can readily be performed.

In Embodiment 8, the second determination threshold value is set to a value smaller than the first determination threshold value; however, the second determination threshold value may be set to a value larger than the first determination threshold value, depending on the failure determination condition. For example, in the case where determination on a failure is performed based on the following first and second determination conditions, the determination on a failure is performed based on the amplitudes of the AC voltages E1 and E2; because the determination on a failure is performed based on whether or not the amplitude is small, the second determination threshold value is larger than the first determination threshold value. Similarly, in this case, the assist commands are limited and the second failure determination unit performs determination on a failure; thus, the determination on a failure is not erroneously performed and it is made possible to more rapidly determine that a failure exists.

first determination condition: $|E1^2+E2^2|<Ath12$
second determination condition: $|E1^2+E2^2|<Ath22$ In the above description, it has been explained that the failure determination unit performs determination on a failure in the motor rotation angle detection unit; however, it may be allowed that the foregoing method is combined with a method in which as another embodiment such as Embodiment 1, determination on a failure in the current detection unit or the electric-power supply unit is performed based on the motor current or the motor voltage and then determination on a failure in the current detection unit, the electric-power supply unit, or the motor rotation angle detection unit is performed. In that case, it is made possible to perform determination on a failure in more units.

It may be allowed that in the second failure determination unit, as is the case with Embodiment 5, the motor rotation angle is estimated and determination on a failure in the motor rotation angle detection unit is performed based on the difference between the detected motor rotation angle $\theta$ and the estimated motor rotation angle estimation value $\theta$est. For example, in the case where the absolute value of the difference between the detected motor rotation angle $\theta$ and the estimated motor rotation angle estimation value $\theta$est is larger than a second determination threshold value Ath23, the second failure determination unit determines that a failure exists.

second determination condition: $|\theta-\theta est|>Ath23$

As described above, the electric power steering apparatus according to Embodiment 8 of the present invention, in the case where the first abnormality determination state amount based on the state of the motor driving unit is larger than the first determination threshold value, the first failure determination unit determines that a failure exists in the motor or the motor driving unit; in the case where the second abnormality determination state amount based on the state of the motor driving unit is larger than the second determination threshold value, the second failure determination unit determines that a failure exists in the motor or the motor driving unit; the first abnormality determination state amount and the second abnormality determination state amount are respective state amounts that are different from each other. As a result, because the second failure determination unit performs determination on a failure with a determination condition that is different from that in the first failure determination unit, it is made possible to widen the range of the condition with which a failure can be detected and hence a failure is more readily detected in comparison with the case where the determination on a failure is performed by the first failure determination unit.

Embodiment 9

Next, an electric power steering apparatus according to Embodiment 9 of the present invention will be explained. In Embodiment 9, the configuration of the assist command generation unit 2 in the configuration of foregoing Embodiment 5 represented in FIG. 8 is changed in such a way as to limit the assist commands in the case where the steering torque $\tau$ detected by the torque detection unit 102 is normal and the value thereof is the same as or larger than a predetermined threshold value and the state where the rotation speed of the motor 1 is the same as or lower than a predetermined threshold value continues.

As the rotation speed of the motor 1, the motor rotation speed estimated by the motor rotation angle estimation unit 9 is utilized; alternatively, the rotation speed of the motor 1 is calculated by differentiating the motor rotation angle estimation value. The threshold value of the rotation speed of the motor 1 is set to a small value with which it can be determined that the motor 1 is locked. As the small value with which it can be determined that the motor 1 is locked, a value that is substantially zero may be utilized; the estimated motor rotation speed is set to, for example, 30 [rpm] or lower, in consideration of the fact that the estimated motor rotation speed has an error for the actual motor rotation speed.

In Embodiment 9, the assist command generation unit 2 is configured in such a way as to limit the assist commands in the case where the steering torque $\tau$ detected by the torque detection unit 102 is normal and the value thereof is the same as or larger than a predetermined threshold value and the state where the rotation speed of the motor 1 is the same as or lower than a predetermined threshold value continues. As a result, it can appropriately be determined that the motor 1 is locked when the steering torque $\tau$ is large and the motor rotation speed is substantially zero—the probability that the motor 1 is locked is extremely high. The fact that it can appropriately be determined that the motor 1 is locked suggests, i.e., that the assist commands can be prevented from being erroneously limited when the locking state has not occurred.

As the motor rotation angle, the motor rotation angle estimation value estimated by the motor rotation angle estimation unit 9 is utilized; however, for example, as is the case with the configuration of Embodiment 1, the motor rotation angle detected by the motor rotation angle detection unit 7 may be utilized.

Embodiment 10

Next, an electric power steering apparatus according to Embodiment 10 of the present invention will be explained. In Embodiment 10, the configuration of the assist command generation unit differs from that in Embodiment 5 represented in FIG. 7; however, other configurations in Embodiment 7 are the same as those in Embodiment 5.

In Embodiment 10, based on the respective positives and negatives of the detected three-phase currents iu, iv, and iw, the assist command generation unit 2 determines whether or not the changes in the respective phases of the currents are small, and limits the assist commands id* and iq* when the state where the steering torque $\tau$ detected by the torque detection unit 102 is normal and the value thereof is the same as or larger than a predetermined threshold value continues and it is determined that the changes in the respective phases of the detected three-phase currents iu, iv, and iw are small. The fact that the changes in the respective phases of the currents are small suggests that there exists probability of the lock state where the motor 1 does not rotate.

The determination on whether or not the changes in the respective phases of the currents are small, which is based on the positives and negatives of the detected three-phase currents iu, iv, and iw, is performed in such a way that a time Tip in which the current is positive during a predetermined time and a time Tim in which the current is negative during the predetermined time are measured and then the determination is performed based on the proportion of Tip to Tim. In the case where the current is always positive during the predetermined time, i.e., in the case where the time Tim is zero, the phase of the current is within the positive phase range; thus, it is determined that the change in the phase of the detected current is small. That fact that the phase of the current is within the positive phase range suggests, i.e., that the rotation angle of the motor 1 is within the angle range in which the current is positive.

When the motor 1 is rotating, [Tip:Tim] becomes [1:1], [1:2], or [1:3]; thus, also in the case where the time Tip in which the current is positive is four or more times as long as the time Tim in which the current is negative, it is determined that the change in the phase of the current is small. Also in the case where the relationship between the positive and the negative is opposite to the foregoing relationship, it is determined that the change in the phase of the current is small.

As described above, the electric power steering apparatus according to Embodiment 10 of the present invention, based on the positives and negatives of the detected currents of the respective phases, the assist command generation unit determines whether or not the changes in the respective phases of the currents are small, and limits the assist commands when the state where the steering torque detected by the torque detection unit is normal and the value thereof is the same as or larger than a threshold value continues and it is determined that the changes in the respective phases of the detected currents are small; as a result, it can appropriately be determined whether or not the motor is locked. A detected motor speed includes a detection error and an estimated motor speed includes an estimation error; therefore, by ascertaining whether or not the changes in the phases of the currents of the respective phases are small, it can more appropriately be determined whether or not the motor is locked.

Each of the foregoing electric power steering apparatuses according to respective Embodiments of the present invention is the one in which at least any one of the following inventions is put into practice.

(1) An electric power steering apparatus comprising:
a torque detection unit that detects steering torque produced by a driver of a vehicle;
a motor that assists steering by a driver;
an assist command generation unit that generates an assist command corresponding to the steering torque;
a motor driving unit that drives the motor, based on the assist command; and
a failure determination unit that performs determination on a failure in the motor or the motor driving unit,
wherein when the state where steering torque detected by the torque detection unit is normal and the value thereof is the same as or larger than a predetermined threshold value continues, the assist command generation unit limits the assist command,
wherein the failure determination unit includes a first failure determination unit that performs determination on the failure regardless of the limitation of the assist command and a second failure determination unit that performs determination on the failure when the limitation is applied to the assist command, and
wherein when the second failure determination unit determines that the failure exists, the failure determination unit stops driving of the motor.

In this invention, the current is limited so that the motor can be prevented from being locked. Moreover, because a failure determination unit only for a time when the assist command is small is provided, erroneous detection caused by a disturbance proportional to the current is readily eliminated and a failure can readily be detected.

(2) The electric power steering apparatus according to (1),
wherein in the case where an abnormality determination state amount based on a state of the motor driving unit is larger than a first determination threshold value, the first failure determination unit determines that a failure exists in the motor or the motor driving unit,
wherein in the case where an abnormality determination state amount based on a state of the motor driving unit is larger than a second determination threshold value, the second failure determination unit determines that a failure exists in the motor or the motor driving unit, and
wherein the second determination threshold value is set to a value smaller than the first determination threshold value.

In this invention, because the threshold value in the second failure determination unit is set to a value smaller than that of the first failure determination unit, there is demonstrated an effect that the second failure determination unit more readily determines that a failure exists than the first failure determination unit.

(3) The electric power steering apparatus according to (1),
wherein in the case where a first abnormality determination state amount based on a state of the motor driving unit is larger than a first determination threshold value, the first failure determination unit determines that a failure exists in the motor or the motor driving unit,
wherein in the case where a second abnormality determination state amount based on a state of the motor driving unit is larger than a second determination threshold value, the second failure determination unit determines that a failure exists in the motor or the motor driving unit, and
wherein the first abnormality determination state amount and the second abnormality determination state amount are state amounts that are different from each other.

In this invention, because the second failure determination unit performs determination on a failure with a determination condition that is different from that in the first failure determination unit, it is made possible to widen the range of the condition with which a failure can be detected and hence there is demonstrated an effect that a failure is readily detected in comparison with the case where the determination on a failure is performed by the first failure determination unit.

(4) The electric power steering apparatus according to any one of (1) through (3), further including a test command generation unit that generates a test command for performing determination on the failure, while the assist command is limited,
wherein the motor driving unit drives the motor, in consideration of the test command, and wherein in the case where the response of the motor does not reflect the test command, the second failure determination unit determines that a failure exists in the motor or the motor driving unit.

In this invention, the second failure determination unit, which performs determination on a failure by use of the test command, more readily performs determination on a failure than the first failure determination unit. Moreover, because the assist command is made small, the response based on the test command is more readily extracted and hence an erroneous determination becomes unlikely to occur.

(5) The electric power steering apparatus according to (4), wherein the test command has its main component having a frequency higher than the mechanical resonance frequency of the steering of the vehicle.

In this invention, because the test command has its main component having a frequency higher than the mechanical resonance frequency of the steering, the effect thereof to steering is suppressed in comparison with the case where a frequency lower than the mechanical resonance frequency of the steering is applied.

(6) The electric power steering apparatus according to any one of (4) and (5), wherein in the case where the value of the current of the motor is smaller than a predetermined value, the second failure determination unit determines that the failure exists.

In this invention, in the case when driving is performed based on the test command, the response of the motor does not reflect the test command, it can be determined that a failure exists.

(7) The electric power steering apparatus according to any one of (4) and (5), wherein the second failure determination unit measures a time in which during a first predetermined time T1, the currents of respective phases of the motor become the same as or larger than a positive predetermined threshold value and a time in which during the first predetermined time T1, the currents of the respective phases of the motor become the same as or smaller than a negative predetermined threshold value; in the case where the time in which the currents of the respective phases of the motor become the same as or larger than the positive predetermined threshold value or the time in which the currents of the respective phases of the motor become the same as or smaller than the negative predetermined threshold value is the same as or shorter than a second predetermined time T2, the second failure determination unit determines that the failure exists.

in this invention, when the time A in which the response of the test command is the same as or larger than a threshold value a, which is a positive value, is shorter than the second predetermined time T2, it can be determined that there exists a failure in which the current is not appropriately supplied in the positive direction. Similarly, there can also be determined a failure in which the current is not appropriately supplied in the negative direction; therefore, there is demonstrated an effect that it is made possible to determine in which direction, i.e., in the positive or negative direction, a failure exists.

(8) The electric power steering apparatus according to any one of (1) through (7), wherein in the case where while the assist command is limited, the second failure determination unit does not determine that a failure exists during a third predetermined time T3, the assist command generation unit cancels the limitation of the assist command.

In this invention, because when no failure exists, the assist can be resumed, there is demonstrated an effect that the force necessary for performing steering is reduced.

(9) The electric power steering apparatus according to any one of (1) through (7),
wherein the second failure determination unit has a normality determination unit that determines, during the limitation of the assist command, whether or not the motor or the motor driving unit has no failure and is normal, and
wherein in the case where after the assist command is limited, the second failure determination unit does not determine that a failure exists during the third predetermined time T3 or determines that no abnormality exists, the assist command generation unit cancels the limitation of the assist command.

In this invention, because when no failure exists, the normality determination unit can more rapidly determine that no failure exists, there is demonstrated an effect that the assist can more rapidly be resumed.

(10) The electric power steering apparatus according to any one of (1) through (9),
wherein the motor driving unit includes a current detection unit that detects a current of the motor and an electric-power supply unit that supplies electric power to the motor, based on the assist command and the detected current, and
wherein the failure determination unit performs determination on a failure in the current detection unit or the electric-power supply unit, based on a current or a voltage of the motor.

In this invention, because the assist command is set to a small value, a voltage disturbance proportional to the current is reduced; thus, there is demonstrated an effect that it is difficult to erroneously perform determination on a failure related to the current flowing path.

(11) The electric power steering apparatus according to any one of (1) through (10),
wherein the motor driving unit has a motor rotation angle estimation unit that calculates an estimation value of the rotation angle of the motor, and
wherein the motor driving unit supplies electric power to the motor, based on the estimation value of the rotation angle of the motor.

In this invention, there is demonstrated an effect that it is made possible to perform determination, while making a distinction between a failure and a deterioration in the control accuracy, caused by a disturbance proportional to the current and an error in the estimated angle.

(12) The electric power steering apparatus according to any one of (1) through (10),
wherein the motor driving unit includes a motor rotation angle detection unit that detects a rotation angle of the motor, an angle detection failure determination unit that performs determination on a failure in the motor rotation angle detection unit, and a motor rotation angle estimation unit that calculates an estimation value of the rotation angle of the motor,
wherein in the case where the motor rotation angle detection unit is normal, the motor driving unit supplies electric power to the motor, based on the detected rotation angle of the motor; in the case where the angle detection failure determination unit determines that a failure exists in the motor rotation angle detection unit, the motor driving unit supplies electric power to the motor, based on the estimation value of the rotation angle of the motor, and
wherein when the state where a failure exists in the motor rotation angle detection unit, steering torque detected by the torque detection unit is normal, and the value of the steering torque is the same as or larger than a predetermined threshold value continues, the assist command generation unit limits the assist command.

In this invention, because even when the motor angle detection unit fails, operation can be performed, as back-up control, by the motor angle estimation unit, there is demonstrated an effect that the assist can be continued and it is made possible that after the back-up control starts, determination can be performed, while making a distinction between a failure and a deterioration in the control accuracy caused by an error in the estimated angle.

(13) The electric power steering apparatus according to any one of (1) through (12), wherein when the state where steering torque detected by the torque detection unit is normal, the value of the steering torque is the same as or larger than a predetermined threshold value, and the rotation speed of the motor is the same as or lower than a predetermined threshold value continues, the assist command generation unit limits the assist command.

In this invention, it can appropriately be determined that the motor is locked when the steering torque is large and the motor rotation speed is substantially zero □ the probability that the motor is locked is high. The fact that it can appropriately be determined that the motor is locked demonstrates an effect that the assist command can be prevented from being erroneously limited when the locking state has not occurred.

(14) The electric power steering apparatus according to any one of (1) through (13), wherein based on the positives and negatives of the detected currents of the respective phases of the motor, the assist command generation unit determines whether or not the changes in the respective phases of the currents are small, and limits the assist command when the state where the steering torque detected by the torque detection unit is normal and the value of the steering torque is the same as or larger than a predetermined threshold value continues and it is determined that the changes in the respective phases of the detected currents are small. This invention demonstrates an effect that because a detected motor speed includes a detection error and an estimated motor speed includes an estimation error, it can more appropriately be determined whether or not the motor is locked, by ascertaining whether or not the changes in the phases of the currents of the respective phases are small.

(15) The electric power steering apparatus according to any one of (1) through (9), wherein the motor driving unit includes a current detection unit that detects a current of the motor, a motor rotation angle detection unit that detects a rotation angle of the motor, an electric-power supply unit that supplies electric power to the motor, based on the assist command, the detected current, and the detected rotation angle of the motor, and wherein the failure determination unit performs determination on a failure in at least one of the current detection unit, the electric-power supply unit, and the motor rotation angle detection unit.

In this invention, because the assist command is set to a small value, a current that flows in the motor is reduced and hence noise in the rotation angle detection unit, caused by the effect of an electromagnetic wave produced by the current, decreases; thus, there is demonstrated an effect that it is difficult to erroneously perform determination on a failure.

The present invention is not limited to the electric power steering apparatus according to each of foregoing Embodiments; in the scope within the spirits of the present invention, the configurations of the respective embodiments can appropriately be combined with one another, can partially be modified, or can partially be omitted.

INDUSTRIAL APPLICABILITY

The present invention can be applied not only to the field of an electric power steering apparatus to be mounted in a vehicle such as an automobile but also to the field of a vehicle, such as an automobile, in which the electric power steering apparatus is mounted.

DESCRIPTION OF REFERENCE NUMERALS

1: motor
2: assist command generation unit
3: motor driving unit
4: failure determination unit
5: power-supply unit
6: current detection unit
7: motor rotation angle detection unit
8: test command generation unit
9: motor rotation angle estimation unit
101: steering wheel
102: torque detection unit
103: steering shaft
104: wheel
105: rack-and-pinion gear
106: control apparatus (ECU)
id*: d-axis assist command
iq*: q-axis assist command
id: d-axis current
iq: q-axis current
vd*: d-axis voltage
vq*: q-axis voltage
vu*, vv*, vw*: coordinate-transformed three-phase voltages
τ: steering torque
Ka: proportional gain
iu, iv, iw: three-phase currents
vu, vv, vw: three-phase voltages
Δid: d-axis current difference
Δiq: q-axis current difference
vu*, vv*, vw*: coordinate-transformed three-phase voltages
α1, α11, Ath1: first determination threshold value
α2, α22, γ, Ath2: second determination threshold value
α3: normality determination threshold value
β1: first torque threshold value
β2: second torque threshold value
T: first predetermined time
T2: second predetermined time
T3: third predetermined time
T4: fourth predetermined time
ΔR2: resistance-value change amount
iah*, ibh*, idh*, iqh*: test command
F: test command flag
F0: assist command limiting flag
ωest: motor-rotation-speed estimation value
θest: motor rotation angle estimation value
E1, E2: AC voltage

The invention claimed is:
1. An electric power steering apparatus comprising:
a torque detector that detects steering torque produced by a driver of a vehicle;
a motor that assists steering by the driver;
an assist command generator that generates an assist command corresponding to the steering torque;
a motor driver that drives the motor, based on the assist command; and
a failure determiner that performs determination on a failure in the motor or the motor driver, wherein when a state where steering torque detected by the torque detector is normal and a value thereof is the same as or larger than a predetermined threshold value continues, the assist command generator limits the assist command, wherein the failure determiner includes a first failure determiner that performs determination on the failure regardless of a limitation of the assist command and a second failure determiner that performs determination on the failure when the limitation is applied to the assist command, and wherein when the second failure determiner determines that the failure exists, the failure determiner stops driving of the motor.

2. The electric power steering apparatus according to claim 1, wherein when an abnormality determination state amount based on a state of the motor driver is larger than a first determination threshold value, the first failure determiner determines that a failure exists in the motor or the motor driver, wherein when an abnormality determination state amount based on a state of the motor driver is larger than a second determination threshold value, the second failure determiner determines that a failure exists in the motor or the motor driver, and wherein the second determination threshold value is set to a value smaller than the first determination threshold value.

3. The electric power steering apparatus according to claim 1, wherein when a first abnormality determination state amount based on a state of the motor driver is larger than a first determination threshold value, the first failure determiner determines that a failure exists in the motor or the motor driver, wherein when a second abnormality determination state amount based on a state of the motor driver is larger than a second determination threshold value, the second failure determiner determines that a failure exists in the motor or the motor driver, and wherein the first abnormality determination state amount and the second abnormality determination state amount are state amounts that are different from each other.

4. The electric power steering apparatus according to claim 1, further including a test command generator that generates a test command for performing determination on the failure, while the assist command is limited, wherein the motor driver drives the motor, in consideration of the test command, and wherein when the response of the motor does not reflect the test command, the second failure determiner determines that a failure exists in the motor or the motor driver.

5. The electric power steering apparatus according to claim 2, further including a test command generator that generates a test command for performing determination on the failure, while the assist command is limited, wherein the motor driver drives the motor, in consideration of the test command, and wherein when the response of the motor does not reflect the test command, the second failure determiner determines that a failure exists in the motor or the motor driver.

6. The electric power steering apparatus according to claim 3, further including a test command generator that generates a test command for performing determination on the failure, while the assist command is limited, wherein the motor driver drives the motor, in consideration of the test command, and wherein when the response of the motor does not reflect the test command, the second failure determiner determines that a failure exists in the motor or the motor driver.

7. The electric power steering apparatus according to claim 4, wherein the test command has its main component having a frequency higher than a mechanical resonance frequency of the steering of the vehicle.

8. The electric power steering apparatus according to claim 5, wherein the test command has its main component having a frequency higher than a mechanical resonance frequency of the steering of the vehicle.

9. The electric power steering apparatus according to claim 6, wherein the test command has its main component having a frequency higher than a mechanical resonance frequency of the steering of the vehicle.

10. The electric power steering apparatus according to claim 4, wherein when a value of a current of the motor is smaller than a predetermined value, the second failure determiner determines that the failure exists.

11. The electric power steering apparatus according to claim 4, wherein the second failure determiner measures a time in which during a first predetermined time T1, currents of respective phases of the motor become the same as or larger than a positive predetermined threshold value and a time in which during the first predetermined time T1, the currents of the respective phases of the motor become the same as or smaller than a negative predetermined threshold value; when the time in which the currents of the respective phases of the motor become the same as or larger than the positive predetermined threshold value or the time in which the currents of the respective phases of the motor become the same as or smaller than the negative predetermined threshold value is the same as or shorter than a second predetermined time T2, the second failure determiner determines that the failure exists.

12. The electric power steering apparatus according to claim 1, wherein if while the assist command is limited, the second failure determiner does not determine that a failure exists during a third predetermined time T3, the assist command generator cancels the limitation of the assist command.

13. The electric power steering apparatus according to claim 1, wherein the second failure determiner has a normality determiner that determines, during the limitation of the assist command, whether or not the motor or the motor driver has no failure and is normal, and wherein when after the assist command is limited, the second failure determiner does not determine that a failure exists during a third predetermined time T3 or determines that no abnormality exists, the assist command generator cancels the limitation of the assist command.

14. The electric power steering apparatus according to claim 1, wherein the motor driver includes a current detector that detects a current of the motor and an electric-power supplier that supplies electric power to the motor, based on the assist command and the detected current, and wherein the failure determiner performs determination on a failure in the current detector or the electric-power supplier, based on the current or a voltage of the motor.

15. The electric power steering apparatus according to claim 1,
- wherein the motor driver has a motor rotation angle estimator that calculates an estimation value of the rotation angle of the motor, and
- wherein the motor driver supplies electric power to the motor, based on the estimation value of the rotation angle of the motor.

16. The electric power steering apparatus according to claim 1,
- wherein the motor driver includes a motor rotation angle detector that detects a rotation angle of the motor, an angle detection failure determiner that performs determination on a failure in the motor rotation angle detector, and a motor rotation angle estimator that calculates an estimation value of the rotation angle of the motor,
- wherein when the motor rotation angle detector is normal, the motor driver supplies electric power to the motor, based on the detected rotation angle of the motor; and when the angle detection failure determiner determines that a failure exists in the motor rotation angle detector, the motor driver supplies electric power to the motor, based on the estimation value of the rotation angle of the motor, and
- wherein when the state where a failure exists in the motor rotation angle detector, steering torque detected by the torque detector is normal, and the value of the steering torque is the same as or larger than a predetermined threshold value continues, the assist command generation unit limits the assist command.

17. The electric power steering apparatus according to claim 1, wherein when the state where steering torque detected by the torque detector is normal, the value of the steering torque is the same as or larger than a predetermined threshold value, and the rotation speed of the motor is the same as or lower than a predetermined threshold value continues, the assist command generator limits the assist command.

18. The electric power steering apparatus according to claim 1, wherein based on the positives and negatives of the detected currents of the respective phases of the motor, the assist command generator determines whether or not the changes in the respective phases of the currents are small, and limits the assist command when the state where the steering torque detected by the torque detector is normal and the value of the steering torque is the same as or larger than a predetermined threshold value continues and it is determined that the changes in the respective phases of the detected currents are small.

19. The electric power steering apparatus according to claim 1,
- wherein the motor driver includes a current detector that detects a current of the motor, a motor rotation angle detector that detects a rotation angle of the motor, and an electric-power supplier that supplies electric power to the motor, based on the assist command, the detected current, and the detected rotation angle of the motor, and
- wherein the failure determiner performs determination on a failure in at least one of the current detector, the electric-power supplier, and the motor rotation angle detector.

* * * * *